US012608219B2

(12) United States Patent
Deaton et al.

(10) Patent No.: US 12,608,219 B2
(45) Date of Patent: Apr. 21, 2026

(54) VIRTUALIZED MEDIUM ACCESS ECOSYSTEM ARCHITECTURE AND METHODS

(71) Applicant: Envistacom, LLC, Atlanta, GA (US)

(72) Inventors: Juan Deaton, Moscow, ID (US); Justin Cook, Woodsboro, MD (US); Michael Geist, Huntersville, NC (US); Michael Beeler, Jefferson, MD (US); Cris Mamaril, Mesa, AZ (US)

(73) Assignee: APOTHYM TECHNOLOGIES GROUP, LLC, Peachtree Corners, GA (US)

( * ) Notice: Subject to any disclaimer, the term of this patent is extended or adjusted under 35 U.S.C. 154(b) by 702 days.

(21) Appl. No.: 17/669,993

(22) Filed: Feb. 11, 2022

(65) Prior Publication Data

US 2022/0261269 A1 Aug. 18, 2022

Related U.S. Application Data

(60) Provisional application No. 63/149,072, filed on Feb. 12, 2021.

(51) Int. Cl.
*G06F 9/455* (2018.01)

(52) U.S. Cl.
CPC ................... *G06F 9/45558* (2013.01); *G06F 2009/45562* (2013.01); *G06F 2009/4557* (2013.01); *G06F 2009/45595* (2013.01)

(58) Field of Classification Search
CPC ....... G06F 9/45558; G06F 2009/45562; G06F 2009/4557; G06F 2009/45595
See application file for complete search history.

(56) References Cited

U.S. PATENT DOCUMENTS

| | | | |
|---|---|---|---|
| 10,397,038 B2 | 8/2019 | Beeler et al. | |
| 11,886,315 B2 * | 1/2024 | Gupta | ..................... H04L 67/10 |
| 2010/0169948 A1 | 7/2010 | Budko et al. | |
| 2015/0327052 A1 | 11/2015 | Ghai | |
| 2018/0302277 A1 | 10/2018 | Shimamura et al. | |
| 2019/0116077 A1 | 4/2019 | Beeler et al. | |

FOREIGN PATENT DOCUMENTS

| | | | | |
|---|---|---|---|---|
| CN | 112231056 A * | 1/2021 | ......... | G06F 9/44594 |
| WO | 2020/167820 A1 | 8/2020 | | |

OTHER PUBLICATIONS

International Search Report received in international application No. PCT/US2022/016133, mailed May 18, 2022.
Pan et al., "Future edge cloud and edge computing for Internet of things applications," IEEE Internet of Things Journal 5.1, Oct. 31, 2017, pp. 439-449, retrieved on Apr. 30, 2022 from <https://ieeexplore.ieee.org/abstract/document/8089336> entire document.

(Continued)

*Primary Examiner* — Diem K Cao
(74) *Attorney, Agent, or Firm* — McBee, Moore & Vanik IP, LLC

(57) ABSTRACT

A reconfigurable infrastructure system comprising a networked cloud of edge computing infrastructure, cloud computing infrastructure, at least one virtual appliance, at least one edge device, and at least one medium controller.

24 Claims, 16 Drawing Sheets

A

B

(56) References Cited

OTHER PUBLICATIONS

Zhou et al., "Network slicing as a service: enabling enterprises' own software-defined cellular networks," IEEE Communications Magazine 54.7, Jul. 14, 2016, pp. 146-153, retrieved on Apr. 30, 2022 from <https://ieeexplore.ieee.org/abstract/document/7509393> entire document.

Essing et al., "The next-generation radio access network: Open and virtualized RANs are the future of mobile networks," Deloitte, Dec. 7, 2020, retrieved on Apr. 30, 2022 from <https://www2.deloitte.com/xe/en/insights/industry/technology/technology-media-and-telecom-predictions/2021/radio-access-networks.html> entire document.

Oren, Doreet, "Satellite-Based Cellular Backhaul: Myths & Facts," Gilat Satellite Networks Ltd., 2018, pp. 1-12.

Network Functions Virtualisation (NVF); Architectural Framework—Group Specification, ETSI GS NFV 002, European Telecommunications Standards Institute, V1.1.1, Oct. 2013, pp. 1-21.

Daehnick, Chris, "Large LEO satellite constellations: Will it be different this time?" retrieved from: <https://www.mckinsey.com/industries/aerospace-and-defense/our-insights/large-leo-satellite-constellations-will-it-be-different-this-time> on Dec. 15, 2020, pp. 1-19.

NSR White Paper, Satellite Ground Network Virtualization, Mar. 2020, pp. 1-14.

United States Space Force Vision for Satellite Communications (SATCOM), Jan. 23, 2020, submitted by William J. Liquori, Jr., pp. 1-6.

ETSI NFV Release 4: Delivered 2021, with cloud-native and container specifications https://www.etsi.org/deliver/etsi_gs/NFV-IFA/001_099/040/04.02.01_60/gs_NFV-IFA040v040201p.pdf.

* cited by examiner

VIRTUALIZED MEDIUM ACCESS ECOSYSTEM ARCHITECTURE AND METHODS

This U.S. patent application claims priority to U.S. Provisional Patent Application No. 63/149,072, filed Feb. 12, 2021, the disclosure of which is herein incorporated in its entirety.

FIELD OF THE INVENTION

This disclosure relates to a reconfigurable infrastructure system comprising a networked cloud of edge computing infrastructure, cloud computing infrastructure, at least one virtual appliance, at least one edge device, and at least one medium controller.

BACKGROUND OF THE INVENTION

New satellite technologies have opened new access to Satellite communication (SATCOM). Recently, capabilities from new High Throughput Satellites have dropped the cost of SATCOM by 4× (from $800 to $200/Mbps/month). Oren "Satellite-Based Cellular Backhaul: Myths and Facts" Gilat Technical White Paper (2018) [Gilate Satellite Networks Ltd.] Additionally, with the deployment of new satellite constellations like OneWeb, Starlink, Telesat, and Kuiper, this cost may further decrease. If the most ambitious plans are realized, up to 50,000 satellites will be in orbit in the next ten years. Daehnick, Klinghoffer, Maritz, and Wiseman, "Large LEO satellite constellations: Will it be different this time?" Mckinsey Industry Insights (2020) [Mckinsey & Company].

This rapid pace of technology change is a huge deviation from the industry norm, where monolithic purpose-built proprietary hardware and waveforms predominate. These rigid solutions that currently dominate SATCOM ecosystems are not suitable for a rapidly changing environment. "Satellite Ground Network Virtualization" NSR White Paper (2020) [Northern Sky Research]; "United States Space Force Vision for Satellite Communications" Vision Document (2020) [U.S. Space Force]. There exists a need in the art for an integrated, flexible, and adaptable system to maximize the capabilities of SATCOM.

SUMMARY OF VARIOUS EMBODIMENTS OF THE INVENTION

In one embodiment, the invention provides for a reconfigurable infrastructure system may comprise a networked cloud of edge computing infrastructure, cloud computing infrastructure, at least one virtual appliance, at least one edge device, and at least one medium controller.

In one embodiment, the system may comprise a plurality of virtual appliances.

In one embodiment, the system may comprise a plurality of edge devices.

In one embodiment, the system may comprise a plurality of medium controllers.

In one embodiment, the plurality of virtual appliances may be physically connected with a plurality of edge devices.

In one embodiment, the plurality of virtual appliances may share a virtual digital sample interface with a single edge device.

In one embodiment, the edge device outputs analog signal may support an analog interface to a medium controller.

In one embodiment, the medium controller may support an analog interface to and edge device.

In one embodiment, the medium controller may support a medium interface.

In one embodiment, the medium interface may be a physical medium that can transmit a signal, optionally a radio frequency (RF), free space optical, optical fibers, copper mediums, or a combination thereof.

In one embodiment, the network cloud may be connected to external networks through a point of presence (PoP).

In one embodiment, the point of presence may be a router or a switch, which routes with internet protocol or multi-protocol label switching.

In one embodiment, the virtual appliances are configured to deploy virtual functions together simultaneously using hardware acceleration.

In an embodiment, the hardware acceleration may be provided by a Field Programmable Gate Arrays (FPGA), Graphics purpose Processing Unit (GPU), Digital Signal Processing (DSP), or a combination thereof.

In an embodiment, the virtual appliances may deploy software virtual machines over hypervisors to provide virtual network functions.

In an embodiment, the virtual appliances may deploy software containers to provide container network functions.

In an embodiment, the virtual appliance may communicate baseband samples with the edge devices using a digital sample interface.

In an embodiment, the digital sample interface receives and/or transmits digital sample interface samples. The digital sample interface samples may be sent using a digital communications interface. The digital communications interface may be a serial digital communications interface. The digital communications interface may be a parallel digital communications interface. The digital communications interface may be IP, PCIe, OpenVPX, physical communications interface of Ethernet, fiber, or a combination thereof.

In an embodiment, a single virtual appliance shares a plurality of digital sample interface interfaces with a plurality of edge devices.

In an embodiment, the virtual digital sample interface connections between a plurality of container network functions or virtual network functions residing on virtual appliances and plurality of edge devices may be dynamically reconfigured by removing, replacing, or adding connections among the plurality of container network functions or virtual network functions residing on virtual appliances and plurality of edge devices.

In an embodiment, a virtual network may support network connectivity among container network functions, virtual network functions, virtual medium access functions, which may be dynamically reconfigured.

In an embodiment, the system uses a protocol that may be a high-level coding language platform running on a high performance computer or a server.

In an embodiment, the high-performance computer may comprise at least one processor and a hardware acceleration device.

In an embodiment, the processor may comprise at least one or more cores, and wherein the hardware acceleration device may comprise at least one of a designated central processing unit, a graphic processing unit, or a field programmable gate array.

In an embodiment, the system may be configured to serve as a signal collection, signal monitoring, signal analyzer, channel simulator, communications system, ranging and detection system, optionally RADAR, SONAR, LIDAR, or a combination thereof.

In one embodiment, the invention provides for a system configured as a virtualized network functions architecture may comprise a medium access communications ecosystem configured to provide physical medium access management of a plurality of mediums; a Network Function Virtualization (NFV) manager configured to deploy at least one virtual medium access network and at least one virtual medium access system; a plurality of virtual medium access networks configured to provide access to a plurality of mediums; a service orchestrator configured to process network configuration orders and turning those orders into directions to the NFV; and a network configuration portal for operators to place orders, network configurations, or both, to deploy a customized virtual medium access network or a plurality of virtual medium access networks.

In an embodiment, the system may comprise a plurality of virtual medium access networks.

In an embodiment, the system may comprise a plurality of virtual medium access systems.

In an embodiment, the medium may comprise a plurality of physical medium resources that can be assigned to virtual medium access networks, virtual medium access systems, and virtual medium access functions.

In an embodiment, the assignment of the plurality of access mediums with a plurality of physical medium resources are managed by a physical medium access manager.

In an embodiment, the physical medium access manager assigns resources to virtual medium access networks and virtual medium access systems.

In an embodiment, the physical medium access manager coordinates resource assignments with the Network Function Virtualization (NFV) manager.

In an embodiment, the Network Function Virtualization (NFV) manager receives directions from a service orchestrator to deploy virtual medium access networks and virtual medium access systems.

In an embodiment, the plurality of virtual medium access networks may be networked together by means of a virtual network.

In an embodiment, the plurality of virtual medium access networks may be managed using a network of network management systems.

In an embodiment, each virtual medium access network may comprise a plurality of virtual medium access systems.

In an embodiment, the plurality of medium access systems may be connected via a virtual network.

In an embodiment, each virtual medium access system may be configured to be used for communications, signal collection, signal generation, or a combination thereof.

In an embodiment, each virtual medium access system utilizes an appropriate virtual network function or virtual medium access function for supporting the functional intent of the system.

In an embodiment, the plurality of medium access systems may be managed with a network management system.

In an embodiment, the plurality of medium access systems may be provided with a virtual network gateway connection to the point of presence.

In an embodiment, each virtual medium access network provides a network management system for the virtual medium access systems.

In an embodiment, the virtual medium access network function may be configured to provide additional functions to support additional fault, configuration, accounting, performance, security management functions, and combinations thereof. The virtual medium access system function or virtual network function may be configured to provide direct communication with the service orchestrator to support network reconfigurations based on a trigger event, which may be a fault or message from the management system to change configuration.

In an embodiment, the network configuration portal presents a user interface to a operator, optionally wherein the operator may be a customer.

In an embodiment, the network configuration portal presents the available medium access networks and systems available and configurable for the application.

In an embodiment, the selection of virtual medium access networks may be constrained by the amount of infrastructure resources.

In an embodiment, wherein after the operator finalizes the selection of virtual medium access network and system the network configuration portal sends the order to the service orchestrator.

In an embodiment, the system may be configured to further provide an application portal to ecosystem partners to upload VNFs that would be available to the operator.

In an embodiment, the system may be configured to further provide a billing and accounts function.

In an embodiment, the billing and accounts function may be configured to support transactions, payments, billing, and combinations thereof for deploying virtual medium access networks and virtual medium access systems. The billing and accounts function may be configured to support transactions, payments, billing, and combinations thereof to partners for ecosystem fees and virtual network function and virtual medium access functions use payments.

In one embodiment, the billing and accounts function may support transactions, payments, billing, and combinations thereof for an ecosystem manager.

In one embodiment, the operator may be a customer.

In an embodiment, the modem architecture may comprise a high-performance computer (HPC) and edge device (ED) electronically coupled by a digital sample interface.

In an embodiment, the high-performance computer (HPC) may comprise a central processing unit (CPU)) coupled to a Field Programmable Gate Arrays (FPGAs), Application Specific Integrated Circuits (ASICs), or both, wherein the HPC configured with data and management input capabilities.

In an embodiment, the edge device may comprise a Digital to Analog Converters (DACs) electronically coupled to a "mix" electronically coupled to physical layer (PL) hardware, electronically coupled to Physical Layer (PL) transmit (TX) and receive (RX) interfaces configured to allow for signal processing.

In one embodiment, the invention provides for a method transmitting and receiving signals over mediums may comprise transmitting and/or receiving a signal at a networked cloud of edge computing infrastructure that executes communications, signal collection, signal generation, and combinations thereof over a medium, transforming the signal received or to be transmitted over a medium into a digitized sample interface via at least one medium controller and at least one edge device, receives the digital sample interface to process or transmits over the digital sample interface via at least one virtual appliance; and supporting virtual network functions or containerized network functions in a virtual medium access system by virtual appliance, edge computing, and/or cloud computing hardware that, for communications, if receiving a digital sample interface, extracts communications information from the digital sample interface or signal characteristics, and if transmitting a digital sample interface, transmits communication information; for signal collection, extracts channel characteristics from the signal, and/or for signal generation, generates a digitized signal.

In an embodiment, the edge device outputs analog signal may support an analog interface to a medium controller.

In an embodiment, the medium controller may support an analog interface to and edge device.

In an embodiment, the medium controller may support a medium interface.

In an embodiment, a network may be configured may comprise a plurality of virtual medium access systems.

In an embodiment, the virtual medium access system may comprise a network may comprise a plurality of virtual network functions.

In an embodiment, the virtual appliances may deploy virtual functions together simultaneously using hardware acceleration.

In an embodiment, the hardware acceleration may be provided by a Field Programmable Gate Arrays (FPGA), Graphics purpose Processing Unit (GPU), Digital Signal Processing (DSP), or a combination thereof.

In an embodiment, the virtual appliances deploy software virtual machines over hypervisors to provide virtual network functions.

In an embodiment, the virtual appliances deploy software containers to provide container network functions.

In an embodiment, the virtual appliance communicates baseband samples with the edge devices using a digital sample interface.

In an embodiment, the digital sample interface receives and/or transmits digital sample interface samples.

In an embodiment, the digital sample interface samples are sent using a digital communications interface.

In one embodiment, the single virtual appliance shares a plurality of digital sample interface interfaces with a plurality of edge devices.

In one embodiment, the virtual digital sample interface connects a plurality of container network functions or virtual network functions residing on virtual appliances and plurality of edge devices remove, replace, and/or add connections among the plurality of container network functions or virtual network functions residing on virtual appliances and plurality of edge devices.

In an embodiment, a virtual network may support network connectivity among container network functions, virtual network functions, virtual medium access functions.

In an embodiment, the method uses a protocol that may be a high-level coding language platform running on a high performance computer or a server. The high-performance computer may comprise at least one processor and a hardware acceleration device. The processor may comprise at least one or more cores, and wherein the hardware acceleration device may comprise at least one of a designated central processing unit, a graphic processing unit, or a field programmable gate array.

The In an embodiment, the method provides signal collection, signal monitoring, signal analyzer, channel simulator, communications method, ranging and detection method, optionally RADAR, SONAR, LIDAR, or a combination thereof.

In one embodiment, the invention provides for a method for receiving and/or transmitting a signal may comprise receiving on and/or transmitting using a system configured as a virtualized network functions architecture may comprise providing physical medium access management of a plurality of mediums by a medium access communications ecosystem; deploying at least one virtual medium access network and at least one virtual medium access system using a Network Function Virtualization (NFV) manager; providing access to a plurality of mediums via a plurality of virtual medium access networks; ordering and turning those orders into directions to the NFV by a service orchestrator configured to process network; and placing orders, network configurations, or both, via a network configuration portal for operators to deploy a customized virtual medium access network or a plurality of virtual medium access networks.

In one embodiment, the plurality of physical medium resources are assigned to virtual medium access networks, virtual medium access systems, and virtual medium access functions.

In an embodiment, a physical medium access manager may manage the assignment of the plurality of access mediums with a plurality of physical medium resources. The physical medium access manager may assign resources to virtual medium access networks and virtual medium access systems.

In an embodiment, the physical medium access manager may coordinate resource assignments with the Network Function Virtualization (NFV) manager. The Network Function Virtualization (NFV) manager may receive directions from a service orchestrator to deploy virtual medium access networks and virtual medium access systems.

In an embodiment, a virtual network may network together the plurality of virtual medium access networks.

In an embodiment, a network of management systems may manage the plurality of virtual medium access networks.

In an embodiment, each virtual medium access network may comprise a plurality of virtual medium access systems.

In an embodiment, the plurality of medium access systems may be connected via a virtual network.

In an embodiment, the method may provide communications, signal collection, signal generation, or a combination thereof.

In an embodiment, a network management system may manage the plurality of medium access systems.

In an embodiment, the plurality of medium access systems may be provided with a virtual network gateway connection to the point of presence.

In an embodiment, each virtual medium access network provides a network management system for the virtual medium access systems.

In an embodiment, the virtual medium access network function may provide additional functions to support additional fault, configuration, accounting, performance, security management functions, and combinations thereof. The virtual medium access system function or virtual network function may be configured to provide direct communication with the service orchestrator to support network reconfigurations based on a trigger event, which may be a fault or message from the management system to change configuration.

In an embodiment, the network configuration portal may present a user interface to an operator, optionally wherein the operator may be a customer.

In an embodiment, the network configuration portal may present the available medium access networks and systems available and configurable for the application.

In an embodiment, the selection of virtual medium access networks may be constrained by the amount of infrastructure resources.

In an embodiment, after the operator finalizes the selection of virtual medium access network and system the network configuration portal may send the order to the service orchestrator.

In an embodiment, the system may be configured to further provide an application portal to ecosystem partners to upload VNFs that would be available to the operator.

In an embodiment, the method may provide a billing and accounts function. The billing and accounts function may support transactions, payments, billing, and combinations thereof for deploying virtual medium access networks and virtual medium access systems. The billing and accounts function may support transactions, payments, billing, and combinations thereof to partners for ecosystem fees and virtual network function and virtual medium access functions use payments. The billing and accounts function may support transactions, payments, billing, and combinations thereof for an ecosystem manager.

In an embodiment, the operator may be a customer.

In one embodiment, the invention provides for a non-transitory computer readable storage medium storing instructions that when executed by a processing device, cause the processing device to transmit and/or receive a signal at a networked cloud of edge computing infrastructure that executes communications, signal collection, signal generation, and combinations thereof over a medium, transform the signal received or to be transmitted over a medium into a digitized sample interface via at least one medium controller and at least one edge device, receive the digital sample interface to process or transmits over the digital sample interface via at least one virtual appliance; and support virtual network functions or containerized network functions in a virtual medium access system by virtual appliance, edge computing, and/or cloud computing hardware that, for communications, if receiving a digital sample interface, extracts communications information from the digital sample interface or signal characteristics, and if transmitting a digital sample interface, transmits communication information; for signal collection, extracts channel characteristics from the signal, and/or for signal generation, generates a digitized signal.

In one embodiment, the invention provides for a non-transitory computer readable storage medium storing instructions that when executed by a processing device, cause the processing device to provide physical medium access management of a plurality of mediums by a medium access communications ecosystem; deploy at least one virtual medium access network and at least one virtual medium access system using a Network Function Virtualization (NFV) manager; provide access to a plurality of mediums via a plurality of virtual medium access networks; order and turn those orders into directions to the NFV by a service orchestrator configured to process network; and place orders, network configurations, or both, via a network configuration portal for operators to deploy a customized virtual medium access network or a plurality of virtual medium access networks.

BRIEF DESCRIPTION OF THE DRAWINGS

The advantages and features of the present invention will become better understood with reference to the following more detailed description taken in conjunction with the accompanying drawings.

DETAILED DESCRIPTION OF PREFERRED EMBODIMENTS

Figure 1:
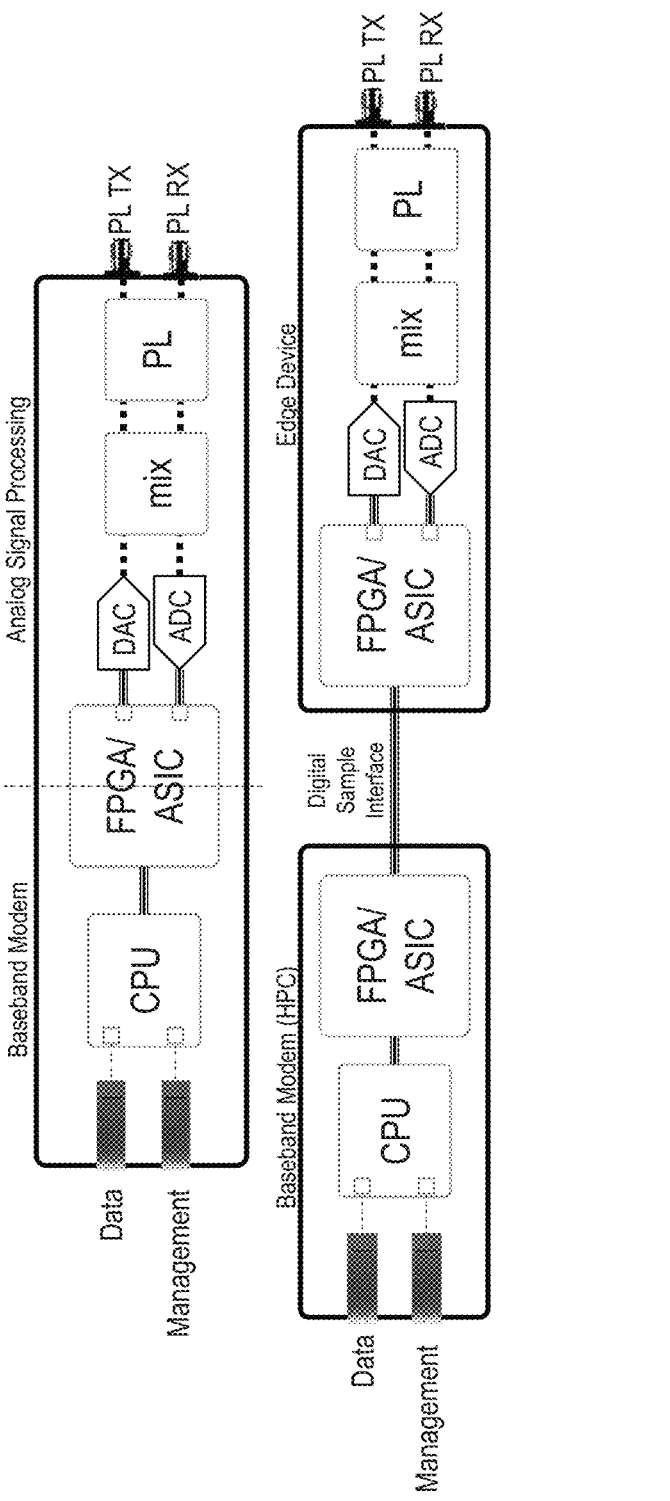
FIG. 1A-B depicts an exemplary generic modem architecture where data and management interfaces are shown on the left. Physical Layer (PL) transmit (TX) and receive (RX) interfaces to the physical access medium are shown on the right. In the top modem architecture (A), the modem and signal processing are integrated into a single purpose-built hardware system. In the bottom modem architecture (B), the modem is split into a high-performance computer (HPC) and edge device (ED) electronically coupled by a digital sample interface, which allows for greater modularization of the components, flexibility in applications, and improvements in system function(s).

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only and is not intended to limit the scope of the present invention, which is limited only by the appended claims.

Definitions

Unless defined otherwise, all technical and scientific terms used herein have the same meaning as commonly understood to one of ordinary skill in the art to which this invention belongs. It should be appreciated that the term "substantially" is synonymous with terms such as "nearly", "very nearly", "about", "approximately", "around", "bordering on", "close to", "essentially", "in the neighborhood of", "in the vicinity of", etc., and such terms may be used interchangeably as appearing in the specification and claims. It should be appreciated that the term "proximate" is synonymous with terms such as "nearby", "close", "adjacent", "neighboring", "immediate", "adjoining", etc., and such terms may be used interchangeably as appearing in the specification and claims.

"Baseband Modem," as used herein, refers broadly to a device that transmutes data to/from the digital sample interface. In a communications application, or generates/receives signals to/from the digital sample interface a transmutes data to/from a communications waveform/protocol. In other applications, the modem may perform tasks of signal collection, ranging, finding, detection, or signal generation.

"Cloud Computing," as used herein, refers broadly to the practice of using a network of remote servers hosted on the internet to store, manage, and process data, rather than a local computing resources.

"Container" or "Software Container," as used herein, refers broadly to a standard unit of software that packages up code and all its dependencies so the application runs quickly and reliably from one computing environment to another.

"Container Network Function," as used herein, refers broadly as to a software container which has the function of supporting services of the network or system through its specific function.

"Container Medium Access Function," as used herein, refers broadly as to a software container which has the function of supporting services of the network or system through its specific function.

"Digital Sample Interface," as used herein, refers broadly to the one of the representation of data bits or signals in a digital form at a baseband frequency, radio frequency, or intermediate frequency either received or transmitted. This representation of data bits is primarily used to replace/minimize the use of analog transmission lines with a digital transmission medium/protocol and modularize modem architectures into a digital modem and edge device. Examples of digital sample interface protocols are VITA 49.2, TIA 5041, and Common Radio Protocol Interface (CPRI). When two or more devices exchange digital sample interface messages it may be referred to this as a digital sample interface connection. The digital sample interface may be a physical connection, software, wireless, or a combination thereof.

"Virtual Digital sample interface," as used herein, refers broadly to a digital sample interface connection that is connected via virtual network or though a software defined network. When two or more device exchange digital sample interface messages using a virtual network, it may be referred to as a virtual digital sample interface connection.

"Digital signal processing (DSP)," as used herein, refers to techniques for improving the accuracy and reliability of digital communications. DSP may work by clarifying, or standardizing, the levels or states of a digital signal.

"Edge Computing," as used herein, refers broadly to the practice of using a network of servers hosted at data or signal source (the "edge") to manage, and process data.

"Edge Device," as used herein, refers broadly to a device that transmutes a single digital sample interface signal to/from a single analog signal, combines and transmutes digital sample interface signals into a single analog signal, extracts and transmutes a signal analog signal into multiple digital sample interface signal. Functions that the edge device performs include, but are not limited to, frequency shifting, filtering, and amplification.

"Geosynchronous Equatorial Orbit (GEO)," as used herein, refers broadly to a circular geosynchronous orbit about 35,786 kilometers (22,236 miles) above the Earth's equator and following the direction of the Earth's rotation.

"Hardware Acceleration" as used herein, refers broadly to the process by which an application will offload certain computing tasks from a CPU onto specialized hardware components-typically FPGAs, GPUs, DSPs, or ASICS-within the system, enabling greater efficiency than is possible in software running on a general-purpose CPU alone.

"High Performance Computer (HPC)," as used herein, refers broadly to a Central Processing Unit (CPU) with hardware acceleration.

"Hypervisor," as used herein, refers broadly to computer software, firmware, hardware, and combinations thereof, which manages hardware resources to support virtual network functions.

"Interface standard," as used herein, refers broadly to a standard that describes one or more functional characteristics (such as code conversion, line assignments, or protocol compliance) or physical characteristics (such as electrical, mechanical, or optical characteristics) necessary to allow the exchange of information between two or more (usually different) systems or pieces of equipment. Communications protocols are an example.

"Medium Controller" as used herein, refers broadly to a device that transmutes and analog signal to/from to a medium signal, where the medium signal is any signal transmitted over a specific medium. Functions that the medium controller performs on the analog signal is frequency shifting, amplification, and transmutation of the analog the signal into the appropriate form so it can travel through its specific medium.

"Medium Earth Orbit (MEO)," as used herein, refers broadly to the region of space around the Earth above LEO but below GEO, e.g., between about 2,000 km (1,200 miles) and 35,786 kilometers (22,236) miles above the Earth's surface (measured from sea level).

"Low Earth Orbit (LEO)," as used herein, refers broadly to an Earth-centered orbit with an altitude of about 2,000 km, (1,200 miles) above the Earth surface (measured from sea level). LEO may also be below about 2,000 km, for example about 1,000 km, or as low as 160 km.

"Medium Channel," is the discrete portion of physical medium described by the N-dimensional resource attributes. For example, for a radio frequency physical medium N-dimensional resources attributes may be frequency, time, and space.

"Medium Access," as used herein, refers broadly to the method by which a signal receiver/transmitter has authorization, permission, or direction to access the physical medium when the signal receiver/transmitter has a physical medium assignment.

"Medium Assignment," as used herein refers to broadly as the method of assignment of physical medium channel to a signal receiver/transmitter usually from a management system.

"Medium Channel Assignment," as used herein refers to broadly a set of physical medium channels are assigned to a set of different signal receivers/transmitters to achieve the objectives of the management system. For example, the objective of the management system in a communications system may be to deliver maximum bandwidth based on service band given a spectrum bandwidth constraint.

"Medium Access Function," as used herein refers to broadly as a set of hardware, software, and hardware that functions to send or receive signals on a physical medium channel. Physical medium access functions can provide communications, signal collection, or signal generation functions for many useful purposes. Communications functions include waveforms and protocols used to exchange information across a medium. Signal collection functions include medium signal time/spectral measurement for analysis. Signal generation functions include medium signal test functions. Examples of non-communications functions include detection and ranging systems (e.g., SONAR, RADAR, LIDAR) and the observation of signals (e.g., lawful intercept, astronomy, signal sensing/identification).

"Medium Access System," as used herein refers to broadly as a set of network functions and medium access functions that form a system. Tasks that the system performs includes connecting network functions together with medium access functions to turn signal collection into information and direct and control signal generation.

"Medium Access Network," as used herein refers to broadly as a set of media access systems performing coordinated functions to achieve the objectives of the management system.

"Network Function Virtualization (NFV)," as used herein, refers broadly to a network architecture that decouples network functions from dedicated hardware through virtualization into a set of Virtual Network Functions (VNF), which are connected together through a virtual or real network, to create services.

"Network Management System (NMS)," as used herein, refers broadly to a system designed for monitoring, maintaining, and optimizing a network. The NMS may comprise a combination of hardware and software. The NMS may also be virtual, e.g., software based.

"Non-transitory computer-readable storage medium," as used herein, refers broadly to a single medium or multiple media (e.g., a centralized or distributed database, and/or associated caches and servers) that can store the one or more sets of instructions. Non-transitory computer-readable storage medium also includes any medium that is capable of storing, encoding or carrying a set of instruction for execution by the machine and that cause the machine to perform any one or more of the methodologies of the disclosure, including, but not be limited to, solid-state memories, and optical and magnetic media.

"Physical medium access," as used herein, refers broadly to the N-dimensional attributes required to channelize a physical medium.

"Point of presence (PoP)," as used herein, refers broadly to a demarcation point, access point, or physical location at which two or more networks or communication devices share a connection. Examples of point of presence include, but are not limited to, routers, switches, servers, and other devices necessary for traffic to cross over networks.

"Service orchestration," as used herein, refers broadly to the execution of the operational and functional processes involved in designing, creating, and delivering an end-to-end service.

"Signal Receiver/Transmitter," as used herein, refers broadly to firmware, software, and hardware that receives/transmits information or signals from/into a medium for the general purposes of communications, signal detection/measurement/collection, or signal generation.

"Software Defined Networking (SDN)," as used herein, refers broadly to a networking paradigm that decouples decisions from networking infrastructure into a logically centralized controller to determine network management policies and operation.

"Virtual Network Function," (VNF) as used herein, refers broadly to a virtualized computing unit (virtual machine), supported through a hypervisor, which has the function of supporting services of the network or system through its specific function.

"Virtual Network," (VNF) as used herein, refers broadly as the combination of hardware and software network resources to combine network functionality into a single software-based administrative entity.

Virtual Medium Access Systems and Methods

This disclosure provides for a reconfigurable infrastructure system comprising a networked cloud of edge computing infrastructure, cloud computing infrastructure, at least one virtual appliance, at least one edge device, and at least one medium controller.

The inventors surprisingly found that the combination of Software Defined Networking (SDN) and Network Function Virtualization (NFV) technologies can be used to support the deployment of virtual networks using homogenous commodity computing hardware for all network functions. This a departure from having different network functions reside within a single computing system. In one embodiment, network resources can be deployed dynamically with increasing network agility while reducing capital and operating expenses. Network Function Virtualization (NFV) acts as a network architecture that decouples network functions from dedicated hardware through virtualization into an entire class of Virtual Network Functions (VNF), which are chained together, to create communication services. Software Defined Networking (SDN) serves as networking paradigm that decouples decisions from networking infrastructure into a logically centralized controller to determine network management policies and operation. In summary, NFV enables the VNFs, SDN enables the virtualization of the networking interfaces between the VNFs, hypervisors enable the virtualization of hardware resources for SDN and VNFs. Although these elements are useful in assembling virtual networks and network functions there are further challenges in virtualizing accelerated computing resources and access to transmission mediums.

Computing resources have been historically based on Central Processing Units (CPUs) becoming heterogeneous (e.g., relying on other silicon architectures for computing) by leveraging Field Programmable Gate Arrays (FPGAs), Application Specific Integrated Circuits (ASICs), Graphics purpose Processing Units (GPUs), and combinations thereof, for hardware acceleration.

High Performance Computers (HPC), CPU architecture with hardware acceleration is used in the art as part of computing architectures, enabling real time signal processing. In past practices, access to accelerators was established through purpose built hardware designed around the accelerator or integrating acceleration into existing designs. Recently, integration has become easier, where accelerators can be deployed as separate modules into computing architectures, e.g., through PCIe (peripheral component interconnect express) cards in network servers. CPU architectures may provide interfaces to allow for direct programing and easier access to hardware acceleration.

In reference to FIG. 1, which depicts exemplary a generic modem architecture, data and management interfaces are shown on the left; Physical Layer (PL) transmit (TX) and receive (RX) interfaces to the physical access medium are shown on the right. Physical access medium may be any medium that can support transmission of a signal, which includes, but is not limited to radio frequency, free space optical, ethernet, fiber optic, and sonar.

As depicted in FIG. 1A, Data port is the port of incoming packet data usually from an IP network. The data interface may be standard ethernet port connection or a QSFP+ port to support up to 100 Gbps interface. The data on the data port represents the data the modem will send over the physical medium. management port provides packet data to the baseband modem for configuration management traffic. Both ports are connected to the CPU via analog interface with a RGMII protocol. CPU is the Central Processing Unit, which is a common computing unit that runs instructions from programs and interacts with memory. CPU-FPGA interfaces may be PCIe, Shared Memory interface, or other standard bus that allows communication and information to be shared between CPU and FPGA memory. FPGA/ASIC component is a Field Programable Gate Array or Application Specific Circuit that is used for digital signal processing, forward error correction, and signal modulation. DAC is the Digital to Analog Converter that interfaces to the FGPA using SPI/JSED interfaces for control/information. The DAC converts digital signals into an analog. ADC is the Analog to digital converter that coverts the analog input to a digital signal that is consumed by the FGPA. Mix is the mixer used to convert the analog frequency to the ADC and from the DAC to from baseband to intermediary frequency or radio frequency. PL is the physical layer medium interface, which is a generic functional block representing an amplifier or conversion over into appropriate physical medium. The physical medium may be a radio frequency, sonar, optical, fiber, or copper physical medium. PL TX is the physical interface into the medium that transmits the signal into the medium. PL RX is the physical interface into the medium that receives the signal from the medium. Baseband modem—is the portion of the modem that performs all the digital signal processing, higher layer protocols, forward error correction, and modulation to generate communication samples at baseband or at IF. Signal processing includes analog signal processing and also signal processing to move signals to IF. In a traditional modem architecture baseband modems and signal processing is tightly linked within the FPGA/ASIC.

In FIG. 1B, the components and interfaces are the same as FIG. 1A with three modifications to the figure. HPC—High Performance Computing, a heterogeneous computing combination between a CPU and another additional computing device such as an FPGA, GPU, DSP, or other ASIC. In FIG. 1B, the block on the left represents an HPC device. Digital sample interface—digital sample interface that communicates the digital samples as packets or blocks and also provides context information along with those digital samples so they are properly interpreted. Edge Device—The edge device provides the conversion from the digital sample interface interface into the physical medium that is being used. The FPGA processes the digital sample interface sample packets to/from the DAC/ADC in the appropriate interfaces and programs the DAC/ADC, mixer, and PL components according to the context packets received on the digital sample interface.

In the modem architecture shown in FIG. 1 panel A, a hardware accelerator typically performs signal processing, in many applications this is almost always a field-programmable gate array (FPGA) or application-specific integrated circuit (ASIC). The FPGA/ASIC performs primarily signal and packet processing. Signal processing includes the translating of data bits into baseband samples, which are converted to analog signals and then sent out a physical interface. In addition to baseband samples, the signal processing part of modems translates the digital signal to analog signals and assigns the frequency for the physical medium. The conversion of the digital signal signals to/from analog signals involves the use of a Digital to Analog Converters (DACs) and Analog to Digital Converters (ADCs). Those analog signals are then transmitted into the physical medium through additional PL hardware specific to the medium. Modem architectures are purpose built, limiting their uses and increasing costs.

The inventors found that if the modem architecture is modularized, it may be produced at lower costs with greater flexibility for applications.

The inventors surprisingly discovered that if integrated, hardware-based modem architectures are split into baseband modem functions and the analog signal processing (e.g., edge device) components then modularization of signal processing may be achieved. FIG. 1, panel B. With the baseband modem physically separated into these functions, the digital sample interface samples created by any waveform can be assigned to the baseband modem. This separation turns the baseband modem into a high-performance computer (HPC), which can be assembled through the use of commodity hardware, greatly reducing the cost of manufacture and allowing flexibility in application, and greater customization, improving the computer function(s).

The baseband modem sends the digital sample interface over a standard interface (e.g., IP, PCIe, InfiniBand) to the analog signal processing (e.g., the Edge Device (ED)), in a practical implementation the ED may be a stand-alone device or a separate PCIe card installed in a server. In a preferred configuration, any baseband modem can send/receive digital sample interface to/from any edge device. The digital sample interface communicates samples and associated frequency context (e.g., center frequency, bandwidth) between the baseband modem and the edge device. Thus, the baseband modem is completely decoupled, where sets of baseband modems and edge devices can be treated as separate resources and commodities. The inventors found that this solved a problem in the computer arts by providing flexibility and adaptability in telecommunications, especially SATCOM, versus the conventional, inflexible, limited, hardware-based systems currently used.

A diagram showing this split is provided in FIG. 1, panel B. The instant disclosure considers pools of HPCs (baseband modems) and edge devices (analog signal processing) forming the basis for medium access resources which, when used in combination of SDN/NFV allow one to begin to deploy virtualized systems and modems. An all-digital, software-only modem is described in U.S. Pat. No. 10,397,038. The inventors surprisingly discovered that the separation between baseband modem and edge devices, and through SDN/NFV networks wireless networks can be completely reconfigurable and now can fully leverage virtualization. In particular, the systems (architecture) and methods described herein provides superior operational capability for of any system that transmits and receives signals over any medium or variety of mediums.

Through SDN/NFV the system and methods described herein provides flexible and agile medium access functions and systems. Medium access functions include communications waveforms, signal collection, or signal generation functions to support medium access systems. Medium access systems include the assembly of network functions together with medium access functions to turn signal collection into information. For example, medium access systems include, but are not limited to, communications applications, like SATCOM, WiFi, or 5G, but can be used for detection and ranging systems (e.g., SONAR, RADAR, LIDAR) and the observation of signals (e.g., lawful intercept, astronomy, sensing). In the event that a better communications waveform or signal collection technique can improve system performance, the medium access function of the medium access system can be replaced with minimal service interruption. In the case of a communications provider, a medium access system can be deployed to observe communications and inject signals for system tests of the communications system. In the most complex systems, a plurality of medium access systems is referred to herein as a medium access network.

The methods and systems described herein have significant benefits for medium access systems which require system upgrades. For SATCOM networks, migration to different satellite constellation, waveform, and frequency can have significant costs associated with acquiring and deploying new equipment and/or reconfiguring old equipment. Cellular networks face similar problems, especially for performing upgrades on thousands of cellular sites for deploying new licenses/waveforms/frequencies. Medium channel assignment is not an isolated problem and is further complicated when a variety of different mediums (e.g., wireless, fiber) and corresponding medium access systems are also considered. For example, if information flow transitions from one medium to another, upgrades on one medium may require cascading upgrades to downstream mediums due to increased volume or quality of information.

The systems and methods described herein provide a system solution that performs physical medium channel assignment, where given set of medium channels, of the same medium, are assigned to a set of different medium access functions to achieve the objectives of the management system. Additionally, the methods and systems described herein provides the medium channel assignment solution for medium access functions/systems/networks with more than one physical medium (e.g., wireless, fiber) are within the same common infrastructure.

Medium Access Hardware Architecture and Virtualized Architecture

The systems and methods described herein provide hardware and virtualized architecture to support fault, performance, configuration, accounting, and security management for array of medium access networks comprised of networks and systems that send or receive a plurality of signals on a plurality of mediums. The systems described herein comprises an ecosystem network and medium access agility that solves current connectivity, accessibility, and cost problems for medium access systems. The systems and methods described herein can be used to deploy a plurality of medium access systems across a plurality of mediums. Additionally, the methods and systems described herein supports reconfigurable medium access systems. The system architecture can become a communications system for a satellite hub, satellite transponder, remote terminal, cellular base station, user terminal, radar, or enterprise wireline network or router. In another embodiment, the system architecture described herein can perform signal collection. Additionally, the system architecture described herein may be configured as a radar system, signal generator, or a combination thereof. In other embodiments, the systems described herein can serve as a radar system, a signal collection platform for lawful intercept, tactical radio, or signal generator system. This flexibility and adaptability of the systems described herein combined with the reduced costs solves problems with the current inflexibility and lack of adaptability in current hardware-based telecommunication systems, including SATCOM systems.

For example, current SATCOM systems have several disadvantages over the systems and methods described herein. Current SATCOM systems are built from purpose-built hardware, software, and firmware, and do not have the level of reconfigurability of the systems and methods described herein. In current practice, purpose-built communications systems may be adaptable from a set of waveforms, which are usually proprietary. Through a combination of proprietary hardware, software, and firmware modem vendors have built walled garden preventing entry from other players to introduce their own waveforms or medium access functions. These walled gardens are an antiquated business model. NFV and SDN networks combined with Software Define Radio (SDR) solutions can be limited to the use of software and CPU architectures. Such approaches are power inefficient and are limited in performance. The systems and methods described herein comprise pooled hardware accelerators, which form heterogeneous computing architectures into the ecosystem architecture. The systems and methods described herein allow for ability to access not only a plurality of transmissions or receptions for a given access medium, but also a plurality of access mediums and management of the physical mediums resources across independent virtualized medium access networks, systems, and functions. Unlike traditional SDN and NFV techniques used in cellular Radio Access Networks (RAN) the systems and methods described herein provide a function known as the Physical Medium Access Manager (PMAM) for the management access resources of a common managed medium, where the medium comprises resources of that specific medium.

The virtual medium access networks and virtual medium access systems described herein are provisioned and deployed through the network configuration portal that provides the operator/customer selections of virtual medium access networks, virtual medium access systems, service level agreement options, and physical medium access resources to deploy or order. In one embodiment, the network configuration portal is a web-based user interface used to configure the virtual wireless network and virtual wireless systems based on this user/customer selection. For example, the systems and methods described herein may present a customer with options for deploying a medium access network like deploying cloud-based computing resources on systems (e.g., Amazon Web Services (AWS), Microsoft Azure, OVH). An advantage over current systems is that the systems and methods described herein allow the user to configure and order their virtual network and systems and order those systems based on the resources available from the hardware infrastructure and the physical medium together.

Figure 9:
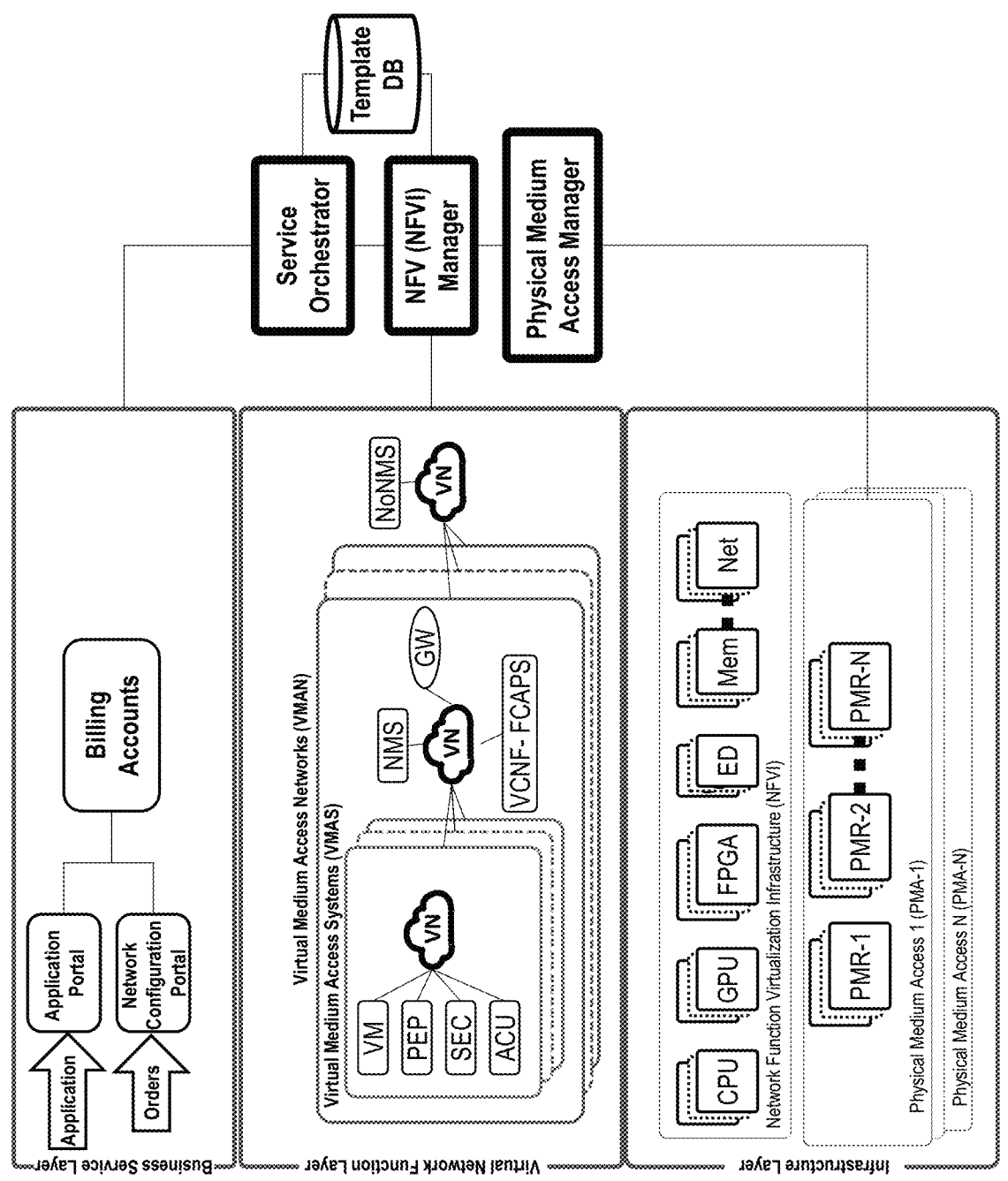
FIG. 9 depicts exemplary virtualized medium access architecture based on infrastructure architecture.

An advantage over current systems is that the systems and methods described herein are based on a second portal for application developers to add their applications into the ecosystem so they can be deployed by through network configuration portal. The systems and methods described herein can present options within a medium access scenario in business ecosystems of applications, currently unavailable. There are two improved aspects of the medium access scenario the management and allocation of medium resources and the management and allocation of analog signal processing resources (edge devices), and medium controllers as in support of the deployment of those applications. In the systems and methods described herein, the application portal only presents virtual medium access networks/systems that can be deployed based on the available medium access resources. A diagram overviewing the virtual environment of the systems and methods described herein is depicted in FIG. 9 showing exemplary virtualized architecture configurations. See also U.S. Pat. No. 10,397,038.

Additionally, the systems and methods described herein comprise virtual appliances, which virtualize key network functions and use hardware accelerator and assigns those resources as necessary to support to the virtual network functions and medium access functions, as needed. Virtual appliances are a flexible hardware container that support heterogeneous computing and flexible functions for signal processing and medium access.

The system described herein may comprise two different components: a hardware architecture and a virtualized architecture. The description that follows begins with the hardware architecture and exemplary virtualized configurations associated with it Hardware Architecture Configurations In reference to FIG. 2, this drawing depicts one embodiment of the first component, a hardware infrastructure configuration. Starting from left to right, connection to any external networks can be through Internet Protocol (IP) network or via Multiprotocol Label Switching (MPLS). Connections to external networks are performed through a Point of Presence (PoP), e.g., a router, FIG. 2. These external connections are to support exfiltration of data or real-time communications. In addition to external networks, the system further comprises a network cloud of connected hardware resources, which may include cloud-based edge computing resources.

External networks are other communications networks outside of the networked cloud that also may be connected via MPLS or IP networks. This is set of networks outside that are connected to the networked cloud. PoP is the Point of Presence it is the routing to the external networks via IP or MPLS links. Networked Cloud is the sum total network that includes multiple computing cloud systems that are fully connected using software defined networking. The networked cloud also includes systems that reside in computing systems in different geolocations. Edge Computing is additional computing resources that are near or the location of the edge devices or medium controllers. It's assumed that edge computing resources are only CPU based resources. Cloud Computing are additional computing resources that are not at the location of the edge devices or medium controllers. Cloud computing resources may be only CPU based computing resources. Virtual appliance computing device that supports HPC by using a hardware accelerator (FPGA, GPU, DSP) for providing high performance communications. Virtual appliances can live in the cloud location or at the edge. However, in this diagram there is a distinction between CPU and HPC resources for sake of clarity of presentation. Digital sample interface is the specific software defined networked routing that carries digital sample interface signals from the virtual appliances to the edge devices. ED are the Edge Devices used to convert the digital sample interface signals into analog signal MC are the Medium Controllers which translate the analog signals into the signal medium.

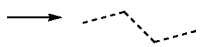

This symbol above represents the signal received from or transmitted into the physical medium.

The cloud and edge computing resources may be general computing resources that can be networking and computing resources which can be used to further manage the set of virtual appliances, edge devices (EDs), and mobile communication (MC) resources. The edge and cloud computing resources may comprise virtual appliances. However, there is a distinction of these resources apart from the virtual appliance. There are several reasons for this distinction. First, the hardware acceleration plays a key role in supporting real-time signal processing, which will in turn support medium access functions. Second, the digital sample interface is an underlying resource to support medium access functions. Given these reasons, presentation is easier to consider with virtual appliances as their own distinct units. To this end, the set of virtual appliances can be used to deploy medium access functions intensive computations that require acceleration. The virtual appliance may be a high-performance computer (HPC).

In one embodiment, hypervisors may be deployed across the entire network cloud to support virtualization of the resources across the edge, cloud, and virtual appliances. In another embodiment, the virtualized architecture may be supported by a common Operating System (OS) instead of a hypervisor, which supports multiple logical software containers instead of virtualized hardware. An example of hypervisor architecture with different virtual functions is shown in FIG. 3 for a wireless communications application.

Figure 3:
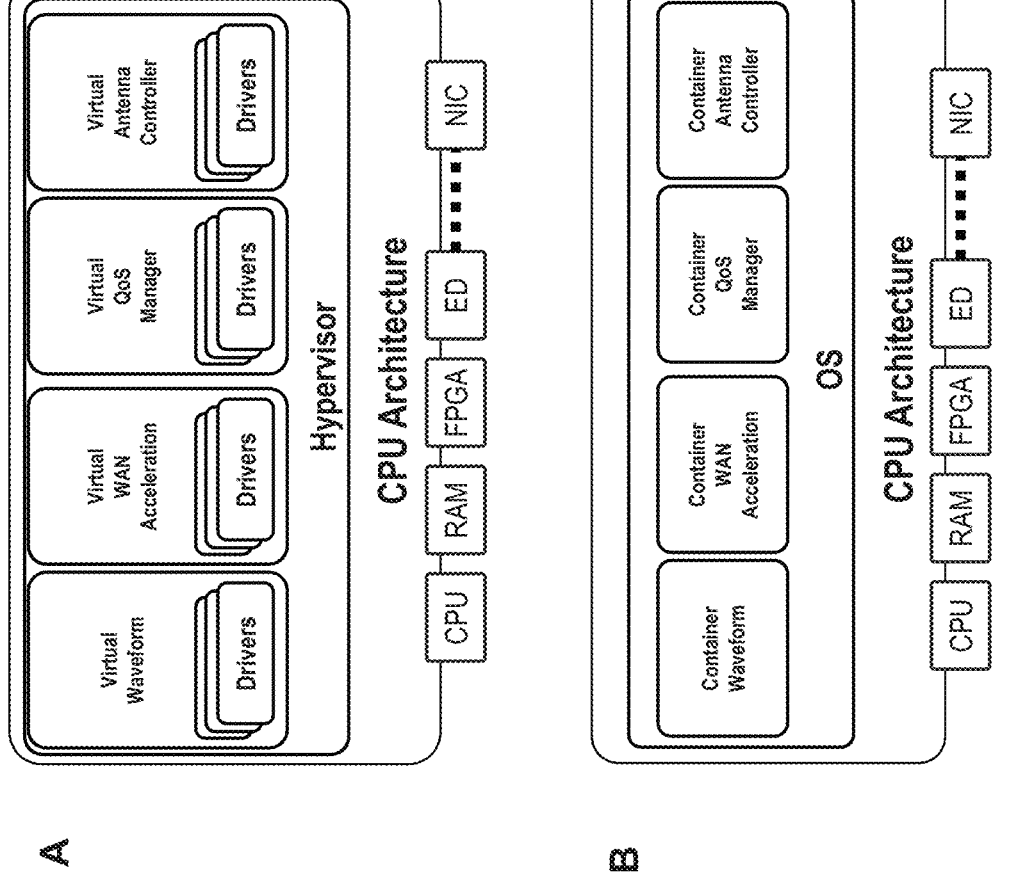
FIG. 3A-B depicts an exemplary implementation of the method and systems described herein. (A) an exemplary hypervisor supporting deployment of multiple virtual network functions leveraging virtualization infrastructure. (B) an exemplary virtualized architecture supported by a common Operating System (OS) (instead of a hypervisor) supporting multiple logical software containers instead of virtualized hardware.

In reference to FIG. 3, the physical resources may dynamically assigned to the associated virtual network functions to deploy a wireless network.

The bottom layer of FIG. 3A represents the resources that can be assigned to each individual virtual function, which is shown at the top layer. These resources may be CPU, RAM (Random Access Memory), Field Programmable Gate Array (FPGA), Edge Device (ED) and Network Interface Card (NIC). Generally, each one of these resources may be partially or completely assigned to be used by a virtual function. CPU Architecture may include the host of computing device(s) and associated hardware for all the associated assignable resources. Hypervisor—This is the hypervisor that assigns the associated resources to each virtual network function. Drivers—Are the software and firmware that allow the virtual network functions interfaces to hardware resources. The Virtual columns are a set of virtual functions assigned to perform an task(s) as assigned. In this drawing, the communications function for modem communicating over a radio frequency medium are shown.

In FIG. 3B, the bottom layer and CPU architecture same as FIG. 3A. OS is the operating system software of the computing device that provides drivers and access to the lower level hardware and kernels of functionality. The various containers are the set of all software containers assigned to perform an associated tasks. In this drawing, communications functions for modem communicated over a radio frequency medium are shown.

Figure 2:
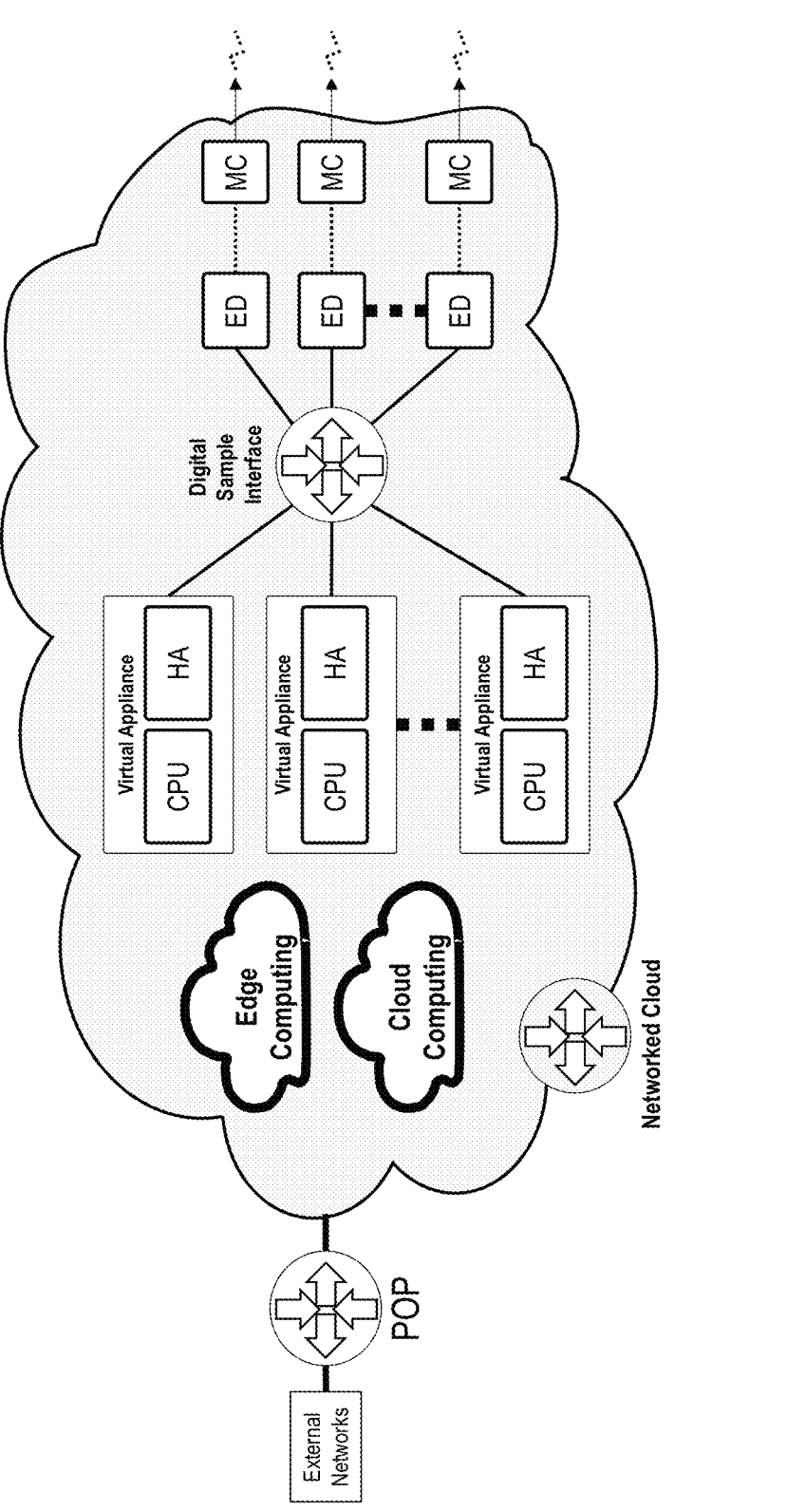
FIG. 2 depicts an exemplary configuration of hardware architecture to support the accompanying virtualization architecture.

The central processing unit (CPU) architecture is shown as a plurality of physical machines and/or virtual appliances, which is compatible with cloud-based infrastructures. While the network cloud supports connection to any device within the cloud, in this embodiment, the digital sample interface is connected with a router. In the systems and methods described herein, Software Defined Networking (SDN) may be used for all routing. For example, ED resources shown in FIGS. 2, 3, and 9, are all via a software defined router to all the different virtual appliances to support dynamic reconfiguration of the network. EDs are a hardware resource that enables signal processing of digital sample interface to an associated analog signal that is received by the Medium Controller (MC). Lastly, hardware architecture of the systems and methods described herein includes a network connection to a set MCs, which convert analog of the ED into signals for the medium. Each MC can include an antenna (e.g., dish, panel, patch, array, Lüneburg lens antenna), an associated antenna controller, frequency mixer, and amplifier used for beam forming or mechanical pointing of the antenna. Luneburg lens antennas are described in U.S. patent application Ser. No. 17/103,667, filed Nov. 24, 2020, herein incorporated by reference in its entirety. MCs are capable of receive or transmit operations associated with their appropriate medium. In the systems and methods described herein, the management interfaces between virtual/container functions and EDs/MCs are dynamically controlled with SDN.

Figure 4:
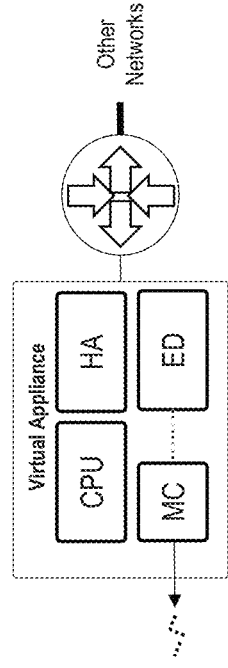
FIG. 4A-B depicts an exemplary implementation of the hardware infrastructure of the systems and methods described herein. (A) Virtual appliance may comprise a CPU, Hardware Accelerator (HA), and edge devices which are associated with medium controllers (MC). The Virtual Appliance is connected to external networks through an IP router. Edge devices (ED) can serve as RX/TX functions on the Virtual Appliance, and this configuration may serve as the end terminal of a network or a transponder function. (B) Same components as (A), but with only one MC/ED.
Figure 4:
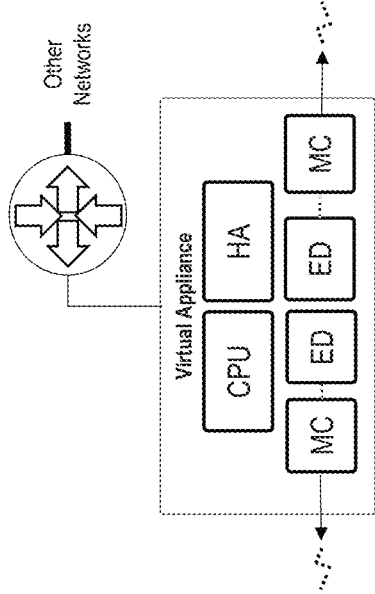

In reference to FIG. 4, in one embodiment, a virtual appliance may comprise a CPU, Hardware Accelerator (HA), and two Edge Devices (ED) each associated with a Medium Controller (MC) (A) or a single Edge Device (ED) associated with a Medium Controller (MC) (B). One virtual appliance may serve as a baseband modem and one RF resource as the RF front end as shown in FIG. 4B. An example of this configuration is a signal collector for spectrum usage awareness or signal generator. Additionally, in FIG. 4A, two edge devices serve as an RX/TX functions on the virtual appliance, and this configuration serves as the end terminal of a network or a transponder function. Examples of the implementation of this configuration includes but is not limited to a radar system, channel simulator, transponder, and test signal generator.

Additionally, the sets of Edge Devices (EDs) may be deployed alongside Medium Controllers (MCs). The EDs are connected via SDN to all the virtual appliances to support the exchange of digital sample interface messages for a plurality of configurations. ED may receive their context information for their received digital sample interface from either a virtualized modem or system/network controller function to coordinate concepts like handoffs and diversity applications. To access the physical medium the medium controller translates output analog signals from the ED into a signal corresponding to the medium (e.g., RF, fiber, sonar, copper, optical). In this configuration, the MC can assume the tasks like amplification, frequency selection, and spatial aspects of the medium (e.g., antenna pointing).

The hardware architecture of the system and methods described herein support a plurality of useful network configurations, where a plurality of virtual appliances can send/receive digital sample interface from a plurality of EDs. Additionally, the system and methods described herein provides a plurality of virtual/container functions that can send/receive digital sample interface from a plurality of EDs.

In reference to FIG. 5, this drawing depicts an exemplary virtual appliance in a configuration receiving/transmitting through a single edge device (A) and receiving/transmitting from a single virtual appliance to multiple EDs that send signal to an MC (B). Physically, hardware may be connected through routers/switches of the network.

Figure 5A:
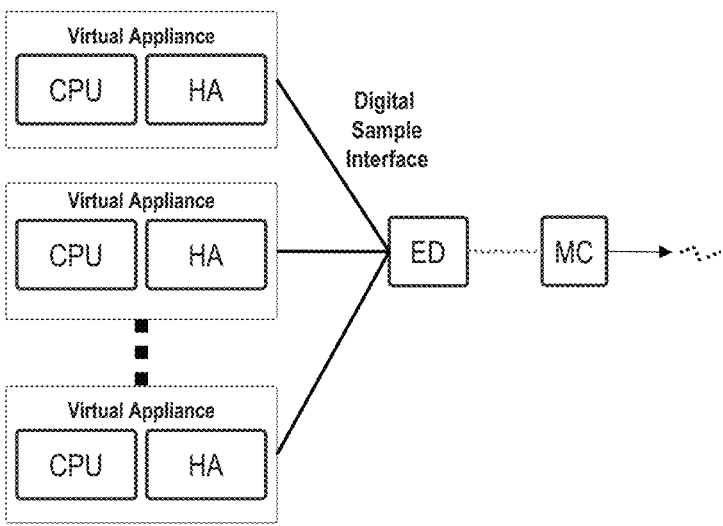
FIG. 5A-B depicts software defined networking used to alter resource configurations of the network. (A) The digital base band of multiple virtual appliances comprising a CPU and Hardware Accelerator (HA) may be routed through a single external ED coupled to an MC. (B) The digital sample interface from a single virtual appliance comprising a CPU and HA may be sent through multiple external Edge Devices (ED) coupled to an Medium Controller (MC).
Figure 5B:
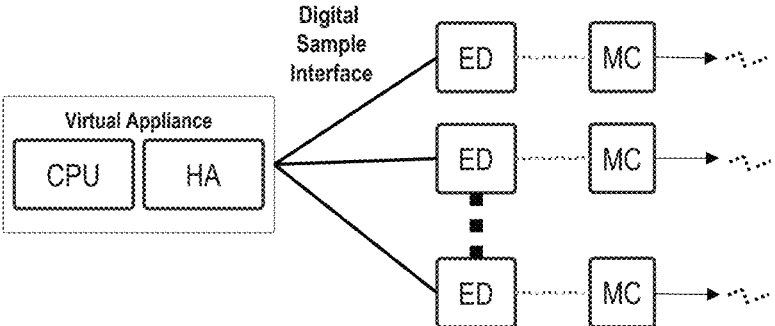

In one embodiment, FIG. 5A, the virtual appliances have digital sample interface interfaces multiplexed at the ED. In this configuration, useful applications for this configuration include but are not limited to diversity gain reception, multiple signal analysis, simultaneous signal analysis and communication, and combinations thereof. In another embodiment, FIG. 5B, the virtual appliances have digital sample interface interfaces to a plurality of EDs. In this embodiment, useful applications include but are not limited to diversity gain, bandwidth management across multiple different mediums, or a combination thereof. Multi-rotational waveforms utilizing a plurality of transmission waveforms and transmission paths are described in U.S. Pat. No. 10,841,145, which is herein incorporated by reference in its entirety.

Figure 6A:
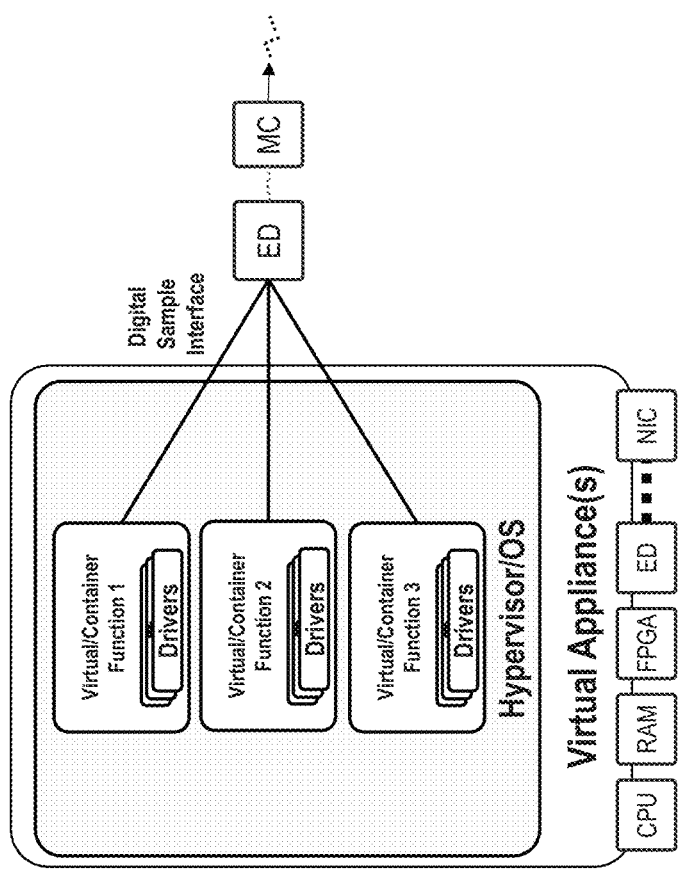
FIG. 6A-B depicts an exemplary configuration comprising multiple virtual/container functions transmitting/receiving digital sample interface to an edge device, either relying on a Virtual Appliance(s) (A) or a Cloud/Edge Computing (B) environment.
Figure 6B:
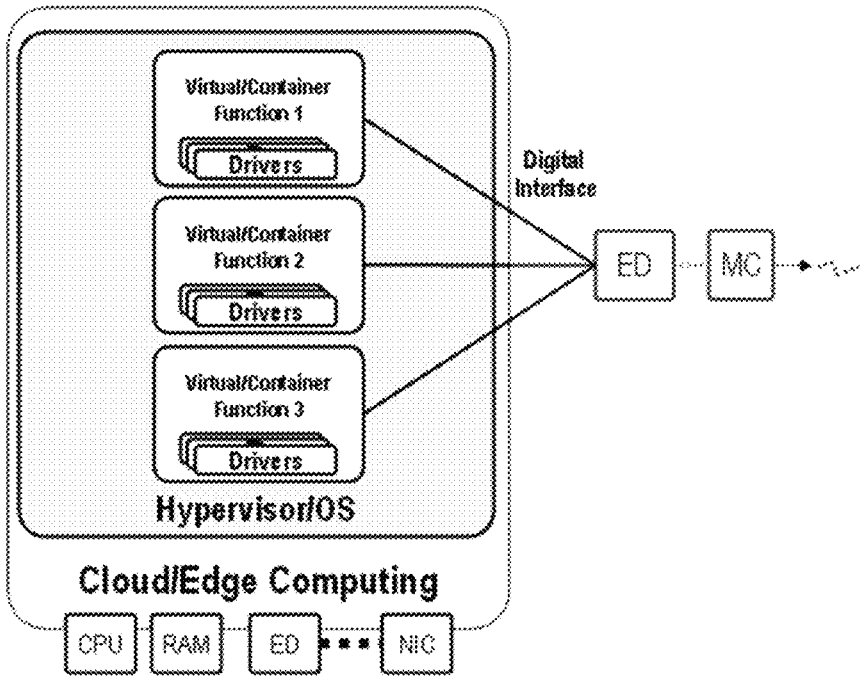

In reference to FIG. 6A-B, the objective of the virtual appliance is to support virtual/container functions in support of virtual wireless networks/systems. FIG. 6A shows an exemplary configuration supported by the systems and methods described herein for digital sample interface communication between the edge device and virtual/container functions deployed on the virtual appliance. The bottom layer shows physical resources as described in FIG. 3A. Virtual appliance(s) block illustrate that these virtual functions that rely on resources within the virtual appliance(s). The Virtual/Container Functions are virtual network functions or containers that can have digital sample interface connection to a single ED, which then combines their signals into a single analog output for the MC. FIG. 6B shows an exemplary configuration supported by the systems and methods described herein for digital sample interface communication between the edge device and virtual/container functions deployed using cloud/edge computing. The bottom layer shows physical resources as described in FIG. 3A. The virtual containers illustrate that the virtual functions that rely on resources within the Cloud/Edge Computing environment. The Virtual/Container Functions are virtual network functions or containers that can have digital sample interface connection to a single ED, which then combines their signals into a single analog output for the MC. The virtual functions run without hardware acceleration and all the same reconfiguration applies as in a FIG. 6A.

Figure 7A:
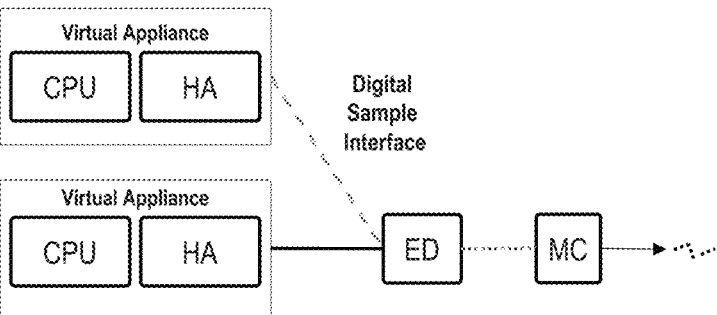
FIG. 7A-C depicts an exemplary configuration comprising connection transitions for network reconfiguration. Dotted lines represents old digital sample interface connections to support the system functions. Solid lines represents a new digital sample interface connection used to replace the old connection that supports the same functions. (A) depicts two virtual appliances comprising an CPU and HA, switching digital sample interface from a first Virtual Appliance to a second Virtual Appliance. (B) depicts one virtual appliance comprising an CPU and HA switching the digital sample interface from a first ED+MC combination to a second ED+MC combination; and (C) depicts two virtual appliances comprising an CPU and HA connected to an ED+MC combination, there the first Virtual Appliance ends the connection (top) and the second begins a new connection (top). The dashed line represents the old digital sample interface connections to support the system functions. The solid line represents the new digital sample interface used to replace the old connection that supports the same functions.
Figure 7B:
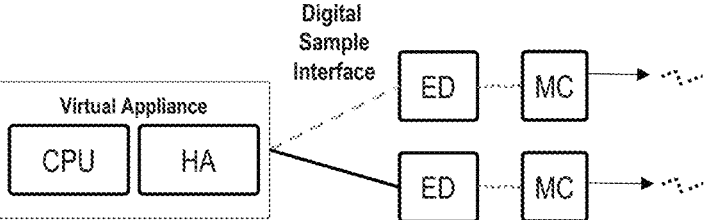
Figure 7C:
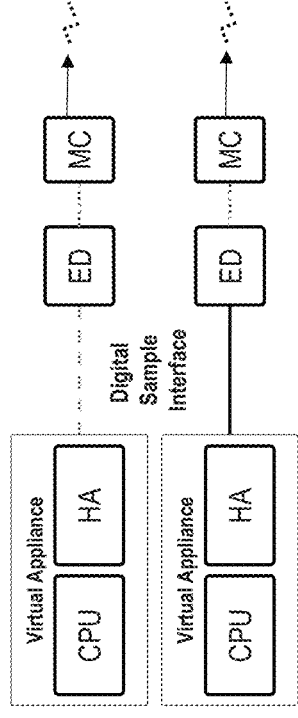

In reference to FIG. 7, in one exemplary configuration, the systems and methods described herein can transition connections to support change of medium access functions or maintenance activities. FIG. 7 depicts two potential handoff techniques between EDs and virtual appliances. In FIG. 7A, the connection between one ED to virtual machine transitions to a different virtual appliance. In FIG. 7B, the connection between one virtual appliance and ED transitions to a different ED. In FIG. 7C, the connection transitions from one virtual appliance/ED+MC combination, to a second, different, virtual appliance/ED+MC combination.

Figure 8A:
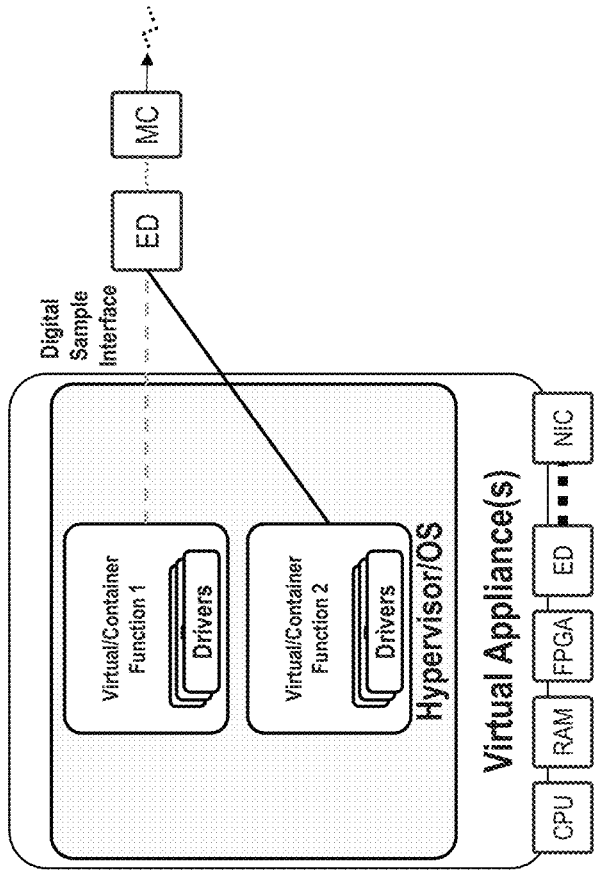
FIG. 8A-B depicts an exemplary configuration where a single virtual appliance can be used to deploy a plurality of virtual functions to transmit and/or tasks. Connection transitions/additions for network reconfiguration are depicted. Similar to FIG. 7, the change in digital sample interface connection occurs at the level of virtual containers within a Virtual Appliance. (A) depicts a Virtual Appliance comprising at least two software containers where a first virtual container hands off a digital sample interface connection from to a second victual container in the same Virtual Appliance to the same ED coupled to a MC. (B) depicts a Virtual Appliance comprising at least two software containers where a first virtual container hands off a digital sample interface connection from a first ED coupled to a MC to a second victual container in the same Virtual Appliance to a second ED coupled to a MC. The dashed line represents the old digital sample interface connections to support the system functions. The solid line represents the new digital sample interface used to replace the old connection that supports the same functions.
Figure 8B:
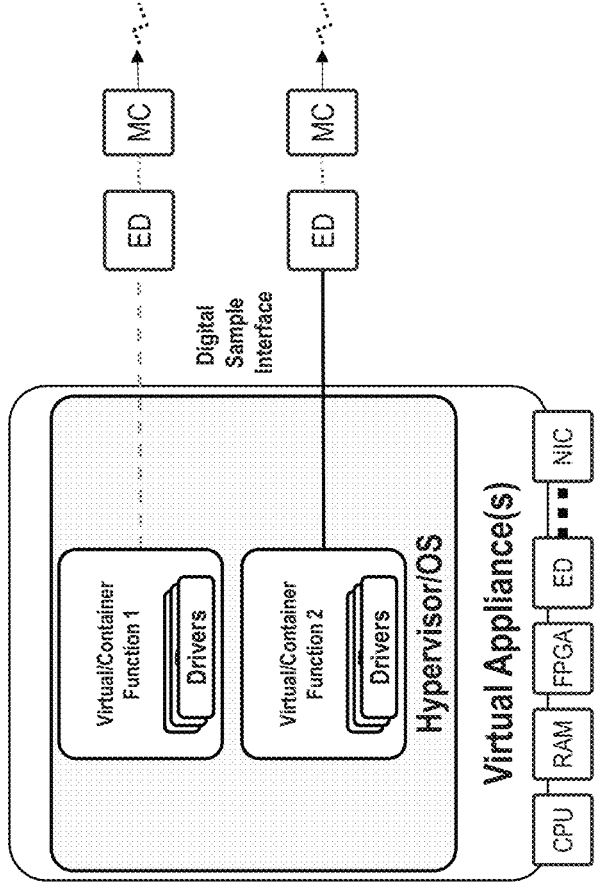

In one exemplary configuration, the systems and methods described herein comprise a single virtual appliance that can deploy a plurality of virtual functions (virtual machines or containers) for transmit or receive tasks, which is referred to herein as virtual medium access functions. In one exemplary configuration, the systems and methods described herein also supports transitions between virtual medium access functions to support reconfiguration and fault management in the network. These connection transitions are depicted in FIG. 8 for virtual functions operating within a virtual appliance. In a similar manner, this same functionality can be used to add or remove connections.

Additionally, each virtual appliance is not constrained to have the same functions for each virtual medium access functions. For example, one virtual medium access function may be used for spectral analysis while the other may be used for communications, while another may be used for test signals or for signal monitoring. In the systems and methods described herein all of the networking and computing functions can be realized into virtual networks and network functions enabled by technologies such as SDN/NFV. In another embodiment, the systems and methods described herein can be used to send parallel data streams of data by using the same or different waveforms, including similar waveforms.

Virtualized Architecture Configurations

The virtualized architecture of the systems and methods described herein use the hardware architecture described herein, exemplified in FIG. 2, as the basis for its operation, as exemplified in FIG. 9.

The virtualized architecture may be logically described in three layers: Infrastructure, Virtual Network Function, and Business Service. The lowest layer is the infrastructure layer, which is the logical association of allocable resources for the virtualized wireless ecosystem architecture. Unlike the standardized NFV architecture (ETSI, "Network Functions Virtualization (NFV) Architectural Framework," ETS GS NFV 002 V1.1.1, October 2013, [Online]), the system and methods described herein comprise an infrastructure layer comprising two logical inner layers: the physical medium access sublayer and the network function virtualization sublayer. There are a plurality of physical medium access layers, one for each medium, which hold the logical grouping of Physical Medium Resources (PMR) for each specific medium. Each physical medium access layer is to serve an as accounting of the resources for media access and media channel assignment.

The other layer in the infrastructure layer is the network function virtualization infrastructure layer, which is the logical grouping of the virtual network management functions (e.g., Network Function Virtualization (NFV) Manager, physical medium access manager, Service Orchestrator) and virtual network functions. Resources pooled in the network function virtualization layer include CPU, Hardware Acceleration, Edge Devices, Memory (including RAM and disk), and networking. These resources are assigned, through the NFV manager, to the virtual network functions and virtual medium access functions.

The NFV manager in the virtual network function layer is responsible for management of resources in infrastructure layer to deploy the virtual medium access network and systems (e.g., virtual medium access networks/systems). This includes both resources from the network function virtualization infrastructure and physical medium access layers Additionally, the NFV manager is also responsible for starting up and tearing down the virtual network functions and networks. To manage this virtual network functions resource usage, the NFV manager also determines optimal resource utilization for all the virtual networks and systems. It is important to note that the resources in any infrastructure layer do not need to be in the same physical location. Infrastructure can be on premises, at the edge, or cloud based infrastructure as well as a simplest configuration deployed in a remote location, as exemplified in FIG. 2. In another embodiment, the infrastructure may be deployed in instances of isolated networks over a wide geographical area, where these networks may have a centralized or distributed control.

The physical medium access manager is responsible for managing the physical medium access layer resources with NFV manager and the virtual medium access networks. The physical medium access resources can be assigned or modified during VNF creation or operation depending on the operation of the ecosystem. For example, in the event fault causes resources to become unavailable, a handoff procedure, and/or any dynamic resource reallocation resources may be reassigned to virtual medium access networks/systems/functions through requests to the physical medium access manager. In another embodiment, the physical medium access manager assigns large allocations of resources, which can be further split into more granular resource allocations by the virtual medium access networks for assignment onto individual systems. For example, the physical medium access manager assigns 100 MHz to of radio spectrum to a virtual medium access network. Then virtual medium access network may evenly divide the spectrum among its virtual medium access systems (e.g., for 10 systems 10 MHz each). In the case of SATCOM system, the physical medium access manager may manage the resources of 5 different satellites each with two different transponders. To access that spectrum there may be a limited number of antennas to control, which may be associated with an ED or the ED may be assigned to operate on the frequencies/antenna. The physical medium access manager initially must be notified of the resource schema and the constraints of granularity for assignment. In general, resources are to be represented widely multidimensional resource blocks and constrained by physical access resources. For example, for SATCOM systems there may be 3 satellites each with 4×150 MHz transponders, but only a single antenna resource or ED that can access them. Management, assignment, and optimization of these physical access resources is the responsibility of the physical medium access manager.

The service orchestrator is responsible for processing orders and translates network configuration order into directions to the NFV manager will create and deploy VNFs. In summary, the service orchestrator assembles and determines the virtual network and needed NFVs based on the customer order. A template database serves a library of all virtual medium access networks and systems, which can be instantiated by the NFV manager. The NFV manager receives the individual commands from the service orchestrator to create each of the virtual network function in the virtual medium access network/system from the service orchestrator based on the templates from the database. The orchestrator does a resource inquiry with the NFV manager, which is then coordinated with the physical medium access manager. In one embodiment, a centralized service orchestrator may also communicate with more than one NFV managers within the network cloud locations to enable reconfiguration in response to changes from the user or resiliency plan. In another embodiment, a distributive service orchestrator model may coordinate resource requests with other service orchestrators in different networks to form a complete network service chain. For example, in a SATCOM system a hub may have its own orchestrator and each individual remote site may also have its own orchestrator. In this way, independent architecture can coordinate reconfigurations to maintain connectivity and interoperability.

To support actual operations, the virtual network function layer has a plurality of virtual medium access networks, which may access a plurality of access mediums. The plurality of virtual medium access network also is connected via a Virtual Network (VN). The set of virtual medium access networks may also be managed by a Network of Network Management System (NoNMS). Each virtual medium access network comprises a plurality of virtual medium access systems. Each virtual medium access system includes an assembly of virtual medium access system functions that when strung together, via a VN, provide functionality for transmission and/or reception of signals from a medium.

In one exemplary configuration, the virtual medium access system described herein may be a communications system. In the example of SATCOM system, the virtual medium access system includes but is not limited to virtualized functions such as: Virtual Modem (VM), Performance Enhancing Proxies (PEP) (e.g., data compression, WAN acceleration), SECurity (e.g., AES encryption), Antenna Control Unit (ACU). The ACU would be an application that would leverage virtual modem data to inform the antenna controller for dish/antenna beam pointing. Stringing together virtualized functions, under common interface standards, different vendors, which called "partners", can provide wireless system functions which may be selectable by the customer/operating who is deploying the wireless system. In this scenario, the VM will interface with the medium, and therefore is a virtual medium access function. The other functions are referred to generically as the virtual network functions.

Sets of virtual medium access systems may further be connected to network management systems, which provide the network operator a method configuration management of all the virtual wireless systems in a virtual wireless network. Additionally, the virtual medium access network can provide access to a gateway function to allow virtual connections to the PoP. Furthermore, Fault, Configuration, Accounting, Performance, and Security (FCAPS) network functions may be virtualized to provide plurality of specific functions required for the virtual medium access network. These functions may be firewalls, network address translation, network performance analysis functions of key performance indicators, network packet inspection, or fault management functions to direct hand overs to different virtual medium access network or virtual medium access system configurations.

The business service layer contains the functions that primarily interface actors or users of the ecosystem. Actors interface the ecosystem through two different portals: the network configuration portal and the application portal. The network configuration portal is used by ecosystem operators or as a customer interface under a managed services business model. In any case, the actor of this network configuration portal selects and configures the virtual wireless systems they wish to deploy and subsequently the virtual wireless networks. These interactions go through the portal and are submitted to the service orchestrator, which then translates the orders for the NFV manager to create the virtual medium access network(s). Similarly, the application portal presents a point of interaction where ecosystem partners offer VNF(s) or applications to be deployed in virtual medium access networks have a point of entry to upload their application into the ecosystem, which is then presented to actors accessing the network configuration portal.

The final part of the business service layer is the billing and accounts function. The billing and accounts function manage billing and payments for orders and applications. In one case, if a customer is accessing the network configuration portal, the cost of virtual wireless network created will be based on the size of the virtual wireless network, features of the network, VNF used, and duration the virtual medium access network is deployed. After actors use the network configuration portal to deploy a virtual medium access network, the billing and accounts function translates the virtual medium access network into a cost, which may issue a bill or transaction to the actor(s). When applications are used and deployed into networks those actors who pay to use those applications and the actors that upload applications through the application portal are then issued payment through the billing and accounting function. Ecosystem maintenance or service fees are also managed by the billing and accounts and can be issued to actors who order services, provide applications, and manage the ecosystem. In summary, the billing and accounts function manages accounts for virtual wireless network orders, application usage, ecosystem usage, and physical medium resources.

For example, the systems described herein may be installed on a non-transitory computer readable storage medium storing instructions that when executed by a processing device, cause the processing device to transmit and/or receive a signal at a networked cloud of edge computing infrastructure that executes communications, signal collection, signal generation, and combinations thereof over a medium, transform the signal received or to be transmitted over a medium into a digitized sample interface via at least one medium controller and at least one edge device, receive the digital sample interface to process or transmits over the digital sample interface via at least one virtual appliance; and support virtual network functions or containerized network functions in a virtual medium access system by virtual appliance, edge computing, and/or cloud computing hardware that, for communications, if receiving a digital sample interface, extracts communications information from the digital sample interface or signal characteristics, and if transmitting a digital sample interface, transmits communication information; for signal collection, extracts channel characteristics from the signal, for signal generation, generates a digitized signal.

The systems described herein may be installed on a non-transitory computer readable storage medium storing instructions that when executed by a processing device, cause the processing device to provide physical medium access management of a plurality of mediums by a medium access communications ecosystem; deploy at least one virtual medium access network and at least one virtual medium access system using a Network Function Virtualization (NFV) manager; provide access to a plurality of mediums via a plurality of virtual medium access networks; order and turn those orders into directions to the NFV by a service orchestrator configured to process network; and place orders, network configurations, or both, via a network configuration portal for operators to deploy a customized virtual medium access network or a plurality of virtual medium access networks.

A method transmitting and receiving signals over mediums, using, for example, the systems and non-transitory computer readable storage medium described herein, may comprise transmitting and/or receiving a signal at a networked cloud of edge computing infrastructure that executes communications, signal collection, signal generation, and combinations thereof over a medium, transforming the signal received or to be transmitted over a medium into a digitized sample interface via at least one medium controller and at least one edge device, receives the digital sample interface to process or transmits over the digital sample interface via at least one virtual appliance; and supporting virtual network functions or containerized network functions in a virtual medium access system by virtual appliance, edge computing, and/or cloud computing hardware that, for communications, if receiving a digital sample interface, extracts communications information from the digital sample interface or signal characteristics, and if transmitting a digital sample interface, transmits communication information; for signal collection, extracts channel characteristics from the signal, for signal generation, generates a digitized signal. The medium may be a physical medium. The communications may comprise waveforms, protocols, or a combination thereof. The signal collection may comprise channel characteristic measurements, signal identification, astronomy, lawful intercept, and combinations thereof. The signal generation may comprise ranging and detecting signals, test signal generation, channel sounding, and combinations thereof. The edge device outputs analog signal may support an analog interface to a medium controller. The medium controller supports an analog interface to and edge device. The medium controller supports a medium interface.

The network may be configured comprising a plurality of virtual medium access systems. The virtual medium access system may comprise a network comprising a plurality of virtual network functions. The virtual appliances deploy virtual functions together simultaneously using hardware acceleration.

The hardware acceleration may be provided by a Field Programmable Gate Arrays (FPGA), Graphics purpose Processing Unit (GPU), Digital Signal Processing (DSP), or a combination thereof.

The virtual appliances may deploy software virtual machines over hypervisors to provide virtual network functions. The virtual appliances may deploy software containers to provide container network functions. The virtual appliance communicates baseband samples with the edge devices using a digital sample interface.

The digital sample interface receives and/or transmits digital sample interface samples. The digital sample interface samples are sent using a digital communications interface. A single virtual appliance may share a plurality of digital sample interface interfaces with a plurality of edge devices. The virtual digital sample interface may connect a plurality of container network functions or virtual network functions residing on virtual appliances and plurality of edge devices remove, replace, and/or add connections among the plurality of container network functions or virtual network functions residing on virtual appliances and plurality of edge devices. The virtual network may support network connectivity among container network functions, virtual network functions, virtual medium access functions.

The method may utilize a protocol that may be a high level coding language platform running on a high performance computer or a server. The high performance computer may comprise at least one processor and a hardware acceleration device. The processor may comprise at least one or more cores, and wherein the hardware acceleration device comprise at least one of a designated central processing unit, a graphic processing unit, or a field programmable gate array.

The methods described herein may provide signal collection, signal monitoring, signal analyzer, channel simulator, communications method, ranging and detection method, optionally RADAR, SONAR, LIDAR, or a combination thereof.

The systems described herein may be used in a method for receiving and/or transmitting a signal comprising receiving on and/or transmitting using a system configured as a virtualized network functions architecture may comprise providing physical medium access management of a plurality of mediums by a medium access communications ecosystem; deploying at least one virtual medium access network and at least one virtual medium access system using a Network Function Virtualization (NFV) manager; providing access to a plurality of mediums via a plurality of virtual medium access networks; ordering and turning those orders into directions to the NFV by a service orchestrator configured to process network; and placing orders, network configurations, or both, via a network configuration portal for operators to deploy a customized virtual medium access network or a plurality of virtual medium access networks.

A plurality of physical medium resources may be assigned to virtual medium access networks, virtual medium access systems, and virtual medium access functions. The physical medium access manager manages the assignment of the plurality of access mediums with a plurality of physical medium resources. The physical medium access manager assigns resources to virtual medium access networks and virtual medium access systems.

The physical medium may access manager coordinates resource assignments with the Network Function Virtualization (NFV) manager. The Network Function Virtualization (NFV) manager receives directions from a service orchestrator to deploy virtual medium access networks and virtual medium access systems. A virtual network networks together the plurality of virtual medium access networks. A network of management systems manage the plurality of virtual medium access networks. Each virtual medium access network may comprise a plurality of virtual medium access systems. The plurality of medium access systems may be connected via a virtual network.

The method may provide communications, signal collection, signal generation, or a combination thereof. A network management system may manage the plurality of medium access systems. The plurality of medium access systems may be provided with a virtual network gateway connection to the point of presence. Each virtual medium access network provides a network management system for the virtual medium access systems. The virtual medium access network function may provide additional functions to support additional fault, configuration, accounting, performance, security management functions, and combinations thereof.

The virtual medium access system function or virtual network function is configured to provide direct communication with the service orchestrator to support network reconfigurations based on a trigger event, which may be a fault or message from the management system to change configuration. The network configuration portal presents a user interface to an operator, optionally wherein the operator may be a customer. The network configuration portal presents the available medium access networks and systems available and configurable for the application. The selection of virtual medium access networks may be constrained by the amount of infrastructure resources.

In the methods described herein, after the operator finalizes the selection of virtual medium access network and system the network configuration portal sends the order to the service orchestrator.

The system may be configured to further provide an application portal to ecosystem partners to upload VNFs that would be available to the operator.

The method may provide a billing and accounts function. The billing and accounts function may support transactions, payments, billing, and combinations thereof for deploying virtual medium access networks and virtual medium access systems. The billing and accounts function may support transactions, payments, billing, and combinations thereof to partners for ecosystem fees and virtual network function and virtual medium access functions use payments. The billing and accounts function may support transactions, payments, billing, and combinations thereof for an ecosystem manager. The operator may be a customer.

A system configured as a virtualized network functions architecture may comprise a medium access communications ecosystem configured to provide physical medium access management of a plurality of mediums; a Network Function Virtualization (NFV) manager configured to deploy at least one virtual medium access network and at least one virtual medium access system; a plurality of virtual medium access networks configured to provide access to a plurality of mediums; a service orchestrator configured to process network configuration orders and turning those orders into directions to the NFV; and a network configuration portal for operators to place orders, network configurations, or both, to deploy a customized virtual medium access network or a plurality of virtual medium access networks. The system may comprise a plurality of virtual medium access networks. The system may comprise a plurality of virtual medium access systems. The medium may comprise a plurality of physical medium resources that can be assigned to virtual medium access networks, virtual medium access systems, and virtual medium access functions. The assignment of the plurality of access mediums with a plurality of physical medium resources are managed by a physical medium access manager. The physical medium access manager assigns resources to virtual medium access networks and virtual medium access systems. The physical medium access manager coordinates resource assignments with the Network Function Virtualization (NFV) manager. The Network Function Virtualization (NFV) manager receives directions from a service orchestrator to deploy virtual medium access networks and virtual medium access systems. The plurality of virtual medium access networks may be networked together by means of a virtual network.

The plurality of virtual medium access networks may be managed using a network of network management systems. Each virtual medium access network comprises a plurality of virtual medium access systems.

The plurality of medium access systems may be connected via a virtual network. Each virtual medium access system may be configured to be used for communications, signal collection, signal generation, or a combination thereof. Each virtual medium access system utilizes an appropriate virtual network function or virtual medium access function for supporting the functional intent of the system. The plurality of medium access systems may be managed with a network management system. The plurality of medium access systems may be provided with a virtual network gateway connection to the point of presence. Each virtual medium access network provides a network management system for the virtual medium access systems. The virtual medium access network function is configured to provide additional functions to support additional fault, configuration, accounting, performance, security management functions, and combinations thereof. The virtual medium access system function or virtual network function may be configured to provide direct communication with the service orchestrator to support network reconfigurations based on a trigger event, which may be a fault or message from the management system to change configuration. The network configuration portal presents a user interface to an operator, optionally wherein the operator is a customer. The network configuration portal presents the available medium access networks and systems available and configurable for the application. The selection of virtual medium access networks may be constrained by the amount of infrastructure resources.

In the systems described herein, after the operator finalizes the selection of virtual medium access network and system the network configuration portal sends the order to the service orchestrator. The system may be configured to further provide an application portal to ecosystem partners to upload VNFs that would be available to the operator. The system may be configured to further provide a billing and accounts function, In the systems described herein, the billing and accounts function may be configured to support transactions, payments, billing, and combinations thereof for deploying virtual medium access networks and virtual medium access systems. The billing and accounts function is configured to support transactions, payments, billing, and combinations thereof to partners for ecosystem fees and virtual network function and virtual medium access functions use payments. The billing and accounts function supports transactions, payments, billing, and combinations thereof for an ecosystem manager. The operator may be a customer.

The systems and methods described herein may be used in a modem architecture comprising a high-performance computer (HPC) and edge device (ED) electronically coupled by a digital sample interface. The high-performance computer (HPC) comprises a central processing unit (CPU)) coupled to a Field Programmable Gate Arrays (FPGAs), Application Specific Integrated Circuits (ASICs), or both, wherein the HPC configured with data and management input capabilities. The edge device comprises a Digital to Analog Converters (DACs) electronically coupled to a "mix" electronically coupled to physical layer (PL) hardware, electronically coupled to Physical Layer (PL) transmit (TX) and receive (RX) interfaces configured to allow for signal processing.

EXAMPLES

Example 1

Virtualized Communications Multi-Medium System

Figure 10:
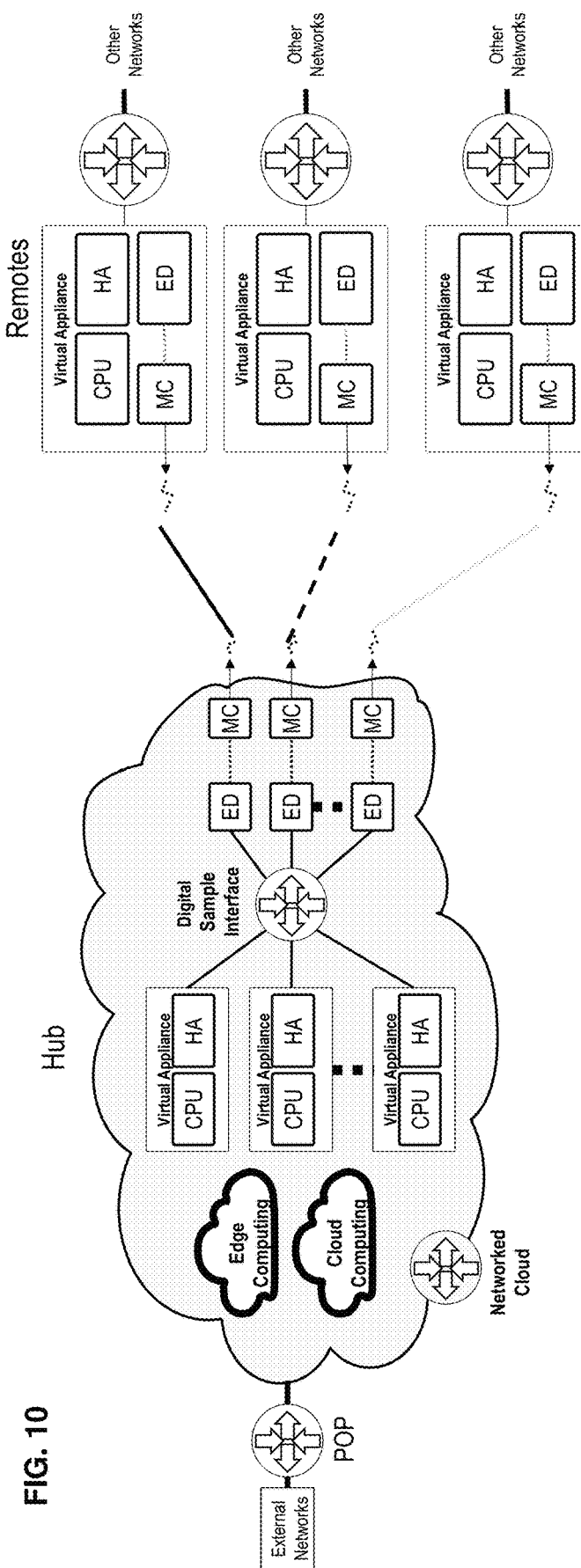
FIG. 10 depicts a hardware use case diagram.

One advantage of the methods and systems described herein is the flexibility for several different hardware and virtual configurations and applications. FIG. 10 shows the hardware configurations of two employed embodiments, which are interacting in a communications scenario. FIG. 10, left, is a large system deployment of the system described herein deploying multiple virtual medium access networks and systems, which is referred to as the "hub". In this example, the hub, FIG. 10 left, would be analogous to a cellular base station (sometimes referred to as an eNode B in 5G) or a satellite hub that manages several connections to many remotes or user devices. FIG. 10, right, shows multiple remote deployments of the simplest configuration variation, which are referred to as remotes. This configuration is analogous to remote end devices or mobile devices in a cellular network. While these configurations show a hardware configuration with each, a corresponding virtual network would also accompany the entire network.

Figure 11:
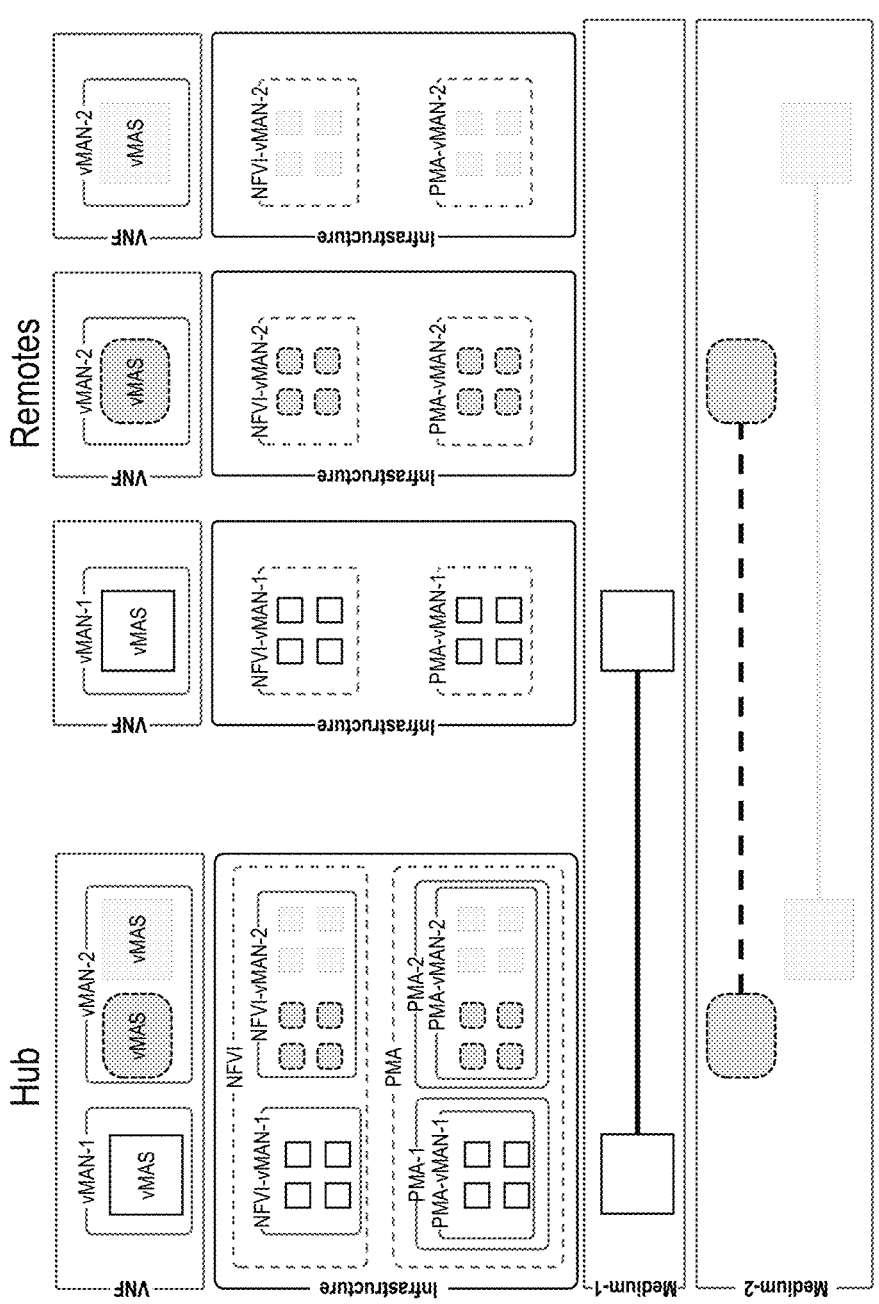
FIG. 11 depicts an example of a virtualized implementation of the hardware configuration for three communications connections.

FIG. 11 shows the virtualization layers of the "stack" from the top Virtual Network Function (VNF) layer down to the medium used for the communications system depicted in FIG. 10. The hub is isolated on the left as a contained virtualized system and the remotes are individually represented on the left as three contained virtualized systems. The VNF layer of the hub contains two different virtual Medium Access Networks (vMANs), it is assumed associated necessary functions for the associated systems. vMAN-1 has one virtual Medium Access System (vMAS) associated with it. The assigned NFVI resources and PMA-1 resources are represented by the square shapes, center aligned with vMAN-1, with at the lowest layer labeled Medium-1. The corresponding matching shapes represent resources assigned to the associated corresponding vMAS are also aligned vertically. Similarly, vMAN-2 shows two vMAS, which both operate on medium 2. For each communication connection there is a least on virtualized remote that corresponds to the shape for the hub.

In another embodiment, the methods and systems described herein can dynamically change its own virtual medium access network function configuration or virtual medium access system configuration. This change of configuration may be a result of the starting at some initial known configuration such that remote components can become connected to the network, a failover configuration to switch physical medium resources, transmission scheme, reception scheme, or other operator directed event for maintenance (e.g., interference event triggers the start a new wireless system that collects RF information). In one embodiment, the system and methods described herein accomplishes reconfiguration of virtual medium access systems by introducing a reconfiguration trigger virtual wireless network function. The task of the reconfiguration trigger is to provide a signal to the service orchestrator to change one or more of the virtual components of the virtual wireless system or virtual wireless network. After the trigger event happens, the reconfiguration trigger virtual wireless network function will signal the service orchestrator of the event. The service orchestrator will then notify billing and accounts of the use of different configuration and direct the NFV manager to reconfigure the network by replacing the network function into a new configuration. If necessary, the spectrum access manager may release or assign new resources to the new configuration as well.

Example 2

System Reconfiguration Due to System Trigger

For this example, an instantiated system that is shown in FIGS. 10 and 11. A reconfiguration of the system can be initiated by what a "trigger". These triggers may be a hardware fault, physical medium fault, a planned reconfiguration as a result of a migration or upgrade, handoff of resources, expansions/releases of resources based on response to service demand, configuration transition of a medium access functions, and/or combination thereof. In the case of a trigger detection, a virtual network function or virtual medium access function notifies the service orchestrator service orchestrator the resolution to the trigger event. Resolution of the trigger event may be allocation or more resources to virtual network functions and/or virtual medium access functions, the addition of virtual network functions and/or virtual medium access functions with associated resources, the reconfiguration of resource medium resources, and/or the reconfiguration of the virtual medium resource functions, and/or combination thereof. Resolutions are accomplished through signals between the service orchestrator, NFV manager, and the physical medium access manager as appropriate to the response.

Example 3

Ecosystem Actors Interactions with the Ecosystem

Another advantage of the system described herein is its interactions with users of the ecosystem. The system and methods described herein in execution may have three primary actors: users, ecosystem provider, and partners. These relationships are analogous to a business model similar to ride sharing, where the users are passengers, the ride sharing company (company and applications) is the ecosystem, and partners are the drivers. In this example, the medium access may be a service, where the hardware infrastructure is owned/managed by the ecosystem provider.

The user interacts with the ecosystem through the network configuration portal by configuring and selecting the virtual medium access functions and virtual network functions that will comprise the virtual medium access system. The user may customize their own system or select from a pre-configured virtual medium access system. Additionally, the user may select additional virtual network functions for the network management system and FCAPS functions to complete the entire selection of the virtual medium access network. After the user has completed selecting and configuring their desired virtual medium access networks, they then can place their "order" and for the ecosystem and the service orchestrator starts the process to instantiate the virtual medium access networks. The billing and accounts systems keeps track of what the user will be billed according to their configuration and time the have their medium access network deployed. Billing and accounts also will bill any fees associated with licensing according to agreements between users, partners, and the ecosystem provider. This is analogous to the ride sharing company collecting fees from customers who connect drivers to riders.

Partners interaction with the ecosystem is similar to users. However, their interactions are based on providing virtual network functions and virtual medium access functions for users. Partners submit their applications into the ecosystem through the application portal. Along with the submission into the ecosystem, a billing agreement for use of their virtual network function or virtual medium access function is also established. The billing agreement includes ecosystem fees provided to the ecosystem provider for each transaction. Additionally, the partner will collect fees when users instantiate their virtual functions. These fees are accounted for in the billing and accounting function in the business service layer.

While the present invention is described with respect to what is presently considered to be the preferred embodiments, it is understood that the invention is not limited to the disclosed embodiments. The present invention is intended to cover various modifications and equivalent arrangements included within the spirit and scope of the appended claims.

Furthermore, it is understood that this invention is not limited to the particular methodology, materials and modifications described and as such may, of course, vary. It is also understood that the terminology used herein is for the purpose of describing particular aspects only and is not intended to limit the scope of the present invention, which is limited only by the appended claims.

Although the invention has been described in some detail by way of illustration and example for purposes of clarity of understanding, it should be understood that certain changes and modifications may be practiced within the scope of the appended claims. Modifications of the above-described modes for carrying out the invention that would be understood in view of the foregoing disclosure or made apparent with routine practice or implementation of the invention to persons of skill in electrical engineering, telecommunications, computer science, and/or related fields are intended to be within the scope of the following claims.

All publications (e.g., Non-Patent Literature), patents, patent application publications, and patent applications mentioned in this specification are indicative of the level of skill of those skilled in the art to which this invention pertains. All such publications (e.g., Non-Patent Literature), patents, patent application publications, and patent applications are herein incorporated by reference to the same extent as if each individual publication, patent, patent application publication, or patent application was specifically and individually indicated to be incorporated by reference.

We claim:

1. A reconfigurable infrastructure system comprising a networked cloud of edge computing infrastructure, cloud computing infrastructure, at least one virtual appliance, a plurality of edge devices, and at least one medium controller, wherein the networked cloud of edge computing infrastructure executes communications, signal collection, signal generation, and combinations thereof over a medium;

wherein the at least one virtual appliance processes or transmits a signal over a digital sample interface, wherein the at least one medium controller and at least one edge device transform the signal received or to be transmitted over the medium into a digitized sample interface, wherein, for communications, if receiving a digital sample interface, extract communications information from the digital sample interface or signal characteristics, and if transmitting a digital sample interface, transmit communication information;

for signal collection, extract channel characteristics from the signal, and/or for signal generation, generate a digitized signal, wherein the digital sample interface receives and/or transmits digital sample interface samples, and wherein a virtual network supports network connectivity among container network functions, virtual network functions, and virtual medium access functions, which is dynamically reconfigured.

2. The system of claim 1, wherein the system comprises a plurality of virtual appliances.

3. The system of claim 2, wherein the plurality of virtual appliances is physically connected with the plurality of edge devices.

4. The system of claim 2, wherein the plurality of virtual appliances share a virtual digital sample interface with a single edge device.

5. The system of claim 1, wherein the system comprises a plurality of medium controllers.

6. The system of claim 1, wherein the edge device outputs analog signal supports an analog interface to a medium controller.

7. The system of claim 1, wherein the medium controller supports an analog interface to an edge device.

8. The system of claim 1, wherein the medium controller supports a medium interface.

9. The system of claim 1, wherein the network cloud is connected to external networks through a point of presence (PoP).

10. The system of claim 9, wherein the point of presence is a router or a switch, which routes with internet protocol or multi-protocol label switching.

11. The system of claim 1, wherein the at least one virtual appliance is configured to deploy virtual functions together simultaneously using hardware acceleration.

12. The system of claim 11, wherein the hardware acceleration is provided by a Field Programmable Gate Arrays (FPGA), Graphics purpose Processing Unit (GPU), Digital Signal Processing (DSP), or a combination thereof.

13. The system of claim 1, wherein the at least one virtual appliance deploys software virtual machines over hypervisors to provide virtual network functions.

14. The system of claim 1, wherein the at least one virtual appliance deploys software containers to provide container network functions.

15. The system of claim 1, wherein the virtual appliance communicates baseband samples with the edge devices using a digital sample interface.

16. The system of claim 1, wherein the digital sample interface samples are sent using a digital communications interface.

17. The system of claim 16, wherein the digital communications interface is a serial digital communications interface.

18. The system of claim 16, wherein the digital communications interface is a parallel digital communications interface.

19. The system of claim 1, wherein a single virtual appliance shares a plurality of digital sample interface interfaces with a plurality of edge devices.

20. The system of claim 1, wherein virtual digital sample interface connections between a plurality of container network functions or virtual network functions residing on virtual appliances and plurality of edge devices may be dynamically reconfigured by removing, replacing, or adding connections among the plurality of container network functions or virtual network functions residing on virtual appliances and plurality of edge devices.

21. The system of claim 1, wherein the system uses a protocol that is a high level coding language platform running on a high performance computer or a server.

22. The system of claim 1, wherein the system is configured to serve as a signal collection, signal monitoring, signal analyzer, channel simulator, communications system, ranging and detection system, optionally RADAR, SONAR, LIDAR, or a combination thereof.

23. A method transmitting and receiving signals over mediums comprising transmitting and/or receiving a signal at a networked cloud of edge computing infrastructure that executes communications, signal collection, signal generation, and combinations thereof over a medium, transforming the signal received or to be transmitted over a medium into a digitized sample interface via at least one medium controller and at least one edge device, receives the digital sample interface to process or transmits over the digital sample interface via at least one virtual appliance; and supporting virtual network functions or containerized network functions in a virtual medium access system by virtual appliance, edge computing, and/or cloud computing hardware that, for communications, if receiving a digital sample interface, extracts communications information from the digital sample interface or signal characteristics, and if transmitting a digital sample interface, transmits communication information;

for signal collection, extracts channel characteristics from the signal, for signal generation, generates a digitized signal.

24. A non-transitory computer readable storage medium storing instructions that when executed by a processing device, cause the processing device to transmit and/or receive a signal at a networked cloud of edge computing infrastructure that executes communications, signal collection, signal generation, and combinations thereof over a medium, transform the signal received or to be transmitted over a medium into a digitized sample interface via at least one medium controller and at least one edge device, receive the digital sample interface to process or transmits over the digital sample interface via at least one virtual appliance; and support virtual network functions or containerized network functions in a virtual medium access system by virtual appliance, edge computing, and/or cloud computing hardware that, for communications, if receiving a digital sample interface, extracts communications information from the digital sample interface or signal characteristics, and if transmitting a digital sample interface, transmits communication information;

for signal collection, extracts channel characteristics from the signal, for signal generation, generates a digitized signal.

* * * * *